US008796367B2

(12) United States Patent
Tsunoda et al.

(10) Patent No.: US 8,796,367 B2
(45) Date of Patent: Aug. 5, 2014

(54) THERMOPLASTIC POLYESTER RESIN COMPOSITION

(75) Inventors: Morio Tsunoda, Hiratsuka (JP); Osamu Takise, Hiratsuka (JP); Yasushi Yamanaka, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 505 days.

(21) Appl. No.: 13/055,407

(22) PCT Filed: Jul. 22, 2009

(86) PCT No.: PCT/JP2009/003420
§ 371 (c)(1),
(2), (4) Date: May 2, 2011

(87) PCT Pub. No.: WO2010/010690
PCT Pub. Date: Jan. 28, 2010

(65) Prior Publication Data
US 2011/0201730 A1 Aug. 18, 2011

(30) Foreign Application Priority Data

Jul. 23, 2008 (JP) ................................. 2008-190284
Oct. 28, 2008 (JP) ................................. 2008-277459
Jul. 8, 2009 (JP) ................................. 2009-162073

(51) Int. Cl.
*C08K 5/3492* (2006.01)

(52) U.S. Cl.
USPC ........................... 524/126; 524/100; 524/140

(58) Field of Classification Search
USPC ....................................................... 524/126
See application file for complete search history.

(56) References Cited

U.S. PATENT DOCUMENTS

| | | | | |
|---|---|---|---|---|
| 5,804,655 | A | * | 9/1998 | Miyatake et al. ............... 525/69 |
| 6,096,816 | A | | 8/2000 | Kuckro |
| 6,547,992 | B1 | * | 4/2003 | Schlosser et al. ............. 252/609 |
| 2004/0192812 | A1 | | 9/2004 | Engelmann et al. |
| 2005/0004296 | A1 | * | 1/2005 | Geck et al. .................... 524/492 |
| 2006/0074154 | A1 | | 4/2006 | Harashina et al. |
| 2008/0039571 | A1 | | 2/2008 | Cohoon et al. |
| 2008/0139711 | A1 | | 6/2008 | Borade et al. |
| 2009/0048373 | A1 | | 2/2009 | Clauss et al. |
| 2011/0184101 | A1 | | 7/2011 | Yamanaka |

FOREIGN PATENT DOCUMENTS

| | | | |
|---|---|---|---|
| CN | | 1732232 A | 2/2006 |
| CN | | 101068884 A | 11/2007 |
| DE | 10 2004 050 555 A1 | | 4/2006 |
| JP | | 2000-44781 A | 2/2000 |
| JP | | 2000-234065 A | 8/2000 |
| JP | | 2000-327886 A | 11/2000 |
| JP | | 2001-342357 A | 12/2001 |
| JP | | 2002-161211 A | 6/2002 |
| JP | | 2004-204194 A | 7/2004 |
| JP | | 2004-331975 A | 11/2004 |
| JP | | 2004-537630 A | 12/2004 |
| JP | | 2005-82723 A | 3/2005 |
| JP | | 2006-117722 A | 5/2006 |
| WO | WO 03/046084 A1 | | 6/2003 |
| WO | WO 2005/078012 | * | 8/2005 |
| WO | WO 2007/077794 A1 | | 7/2007 |
| WO | WO 2008/026575 A1 | | 3/2008 |

OTHER PUBLICATIONS

Database WPI, Week 200452, Thomson Scientific, XP-002655689, 6 pages, 2004.
Extended European Search Report, dated Aug. 11, 2011, for European Application No. 09800207.4.
Extended European Search Report, dated Aug. 16, 2011, for European Application No. 09800206.6.
International Preliminary Report on Patentability and Written Opinion of the International Searching Authority, dated Feb. 3, 2011 (including English translation dated Mar. 17, 2011), for Application No. PCT/JP2009/003420.
International Preliminary Report on Patentability and Written Opinion of the International Searching Authority, dated Feb. 3, 2011 (including English translation dated Mar. 17, 2011), for Application No. PCT/JP2009/003421.
International Search Report, dated Oct. 13, 2009, for Application No. PCT/JP2009/003421.
Chinese Office Action, dated Jun. 25, 2012, for Chinese Application No. 200980128696.3.
Notification of First Office Action for Chinese Patent Application No. 200980128698.2, issued May 17, 2012, with English translation.
U.S. Office Action, dated Mar. 12, 2012, for copending U.S. Appl. No. 13/055,420.
International Search Report for PCT/JP2009/003420 mailed Oct. 13, 2009.
Japanese Office Action and English translation thereof, dated Jun. 4, 2013, for Patent Application No. 2008-277459.
Japanese Office Action, dated Apr. 16, 2013, for Japanese Application No. 2009-169123 with English Translation.
Japanese Office Action for Japanese Application No. 2009-170842 dated Sep. 17, 2013, with English language translation.

* cited by examiner

*Primary Examiner* — Doris Lee
(74) *Attorney, Agent, or Firm* — Birch, Stewart, Kolasch & Birch, LLP

(57) ABSTRACT

A thermoplastic polyester resin composition comprising 100 parts by weight of a thermoplastic polyester resin (A), 5 to 40 parts by weight of a phosphinate (B), and an organosiloxane (X);
wherein the phosphinate is a calcium salt or aluminum salt of phosphine acid having the anion part having a particular structure;
which, as the organosiloxane (X), comprises 1.5 to 10 parts by weight of an organosiloxane compound (X-1) or 0.01 to 5 parts by weight of an organosiloxane polymer (X-2), relative to 100 parts by weight of the thermoplastic polyester resin (A); and
wherein the organosiloxane compound (X-1) comprises organic groups bonding to a silicon atom directly or through an oxygen atom, and 40 mole % or more of the organic groups are an aryl group, and the organosiloxane polymer (X-2) is in the form of solid at 25° C.

25 Claims, No Drawings

THERMOPLASTIC POLYESTER RESIN COMPOSITION

TECHNICAL FIELD

The invention relates to a thermoplastic polyester resin composition which is excellent in mechanical characteristics in addition to flame resistance even if the resin composition does not include any halogen series flame retardant, and to a molded article using the same.

RELATED ART

The thermoplastic polyester resin is widely used for electrical and electronics equipment components in addition to automobile components from the viewpoint of the excellent characteristics. Heretofore, various recipes for such a resin have been developed so as to satisfy desired characteristics, and thereby achievement of high functionality and high performance has been made.

However, in recent years, characteristics to be desired are becoming higher, and therefore, it is becoming difficult to manage to use conventional recipes. For example, in recent years, electronic components such as connector are getting more lightweight and smaller, and the thickness of such a molded article is getting thinner. Accordingly, to respond to this, there is a case that the resin composition for use in such molding is desired to have more excellent mechanical characteristics and flame resistance than conventional resin compositions.

In addition, since the thickness of molded articles in molding is getting thinner, being demanded is a resin excellent in toughness (a characteristic represented by tensile elongation) to give molded flakiness articles having a larger mechanical strength. Also demanded is a resin excellent in mold release performance so as to prevent molded articles from deforming in molding, and a resin excellent in friction and abrasion resistance so as to prevent electronic conduction failure due to abrasion powder which occurs by contacting molded article with each other.

In the field for electric and electronic equipment, flame resistance is important for ensuring safety against fire disaster, and it is necessary to be excellent in tracking resistance which is one of electronic characteristics for ensuring safety against ignition due to electronic load. Further, since a resin containing a halogen series flame retardant may produce dioxin when a used molded article thereof is incinerated, it is desirable that a non-halogen series flame retardant imparts the resin with flame resistance.

Heretofore, a halogen series flame retardant has been mainly used as a flame retardant for a resin. However, as mentioned above, a resin containing a halogen series flame retardant may produce dioxin when a used molded article thereof is incinerated, and therefore, it is desirable to use a non-halogen series flame retardant. As one for responding to such a demand, it is investigated that phosphorous compounds, especially a calcium salt or aluminium salt of phosphine acid represented by the following formula (1) or (2), are used as a flame retardant.

[Chemical 1]

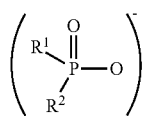

(1)

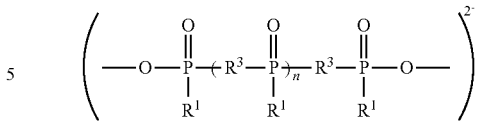

wherein $R^1$'s and $R^2$ each independently are an alkyl group having 1 to 6 carbon atoms, or an aryl group which may have a substituent; $R^1$'s may be the same or different to each other; $R^3$'s are an alkylene group having 1 to 10 carbon atoms, an arylene group which may have a substituent, or a combination of at least two thereof; $R^3$'s may be the same or different to each other; and n is an integer of 0 to 4.

Patent Document 1 discloses use of the calcium phosphinate or the aluminium phosphinate as a flame retardant. However, such a method requires a large amount of the salt in order to achieve good flame resistance and results in lower moldability and mechanical characteristic of the obtained resin composition.

Patent Document 2 discloses a combination use of a calcium phosphinate or an aluminium phosphinate with an organic nitrogen compound such as melamine cyanurate as a flame retardant. Such a method improves the flame resistance to some degree. However, it is difficult to make a molded flakiness article (for example, a molded article having a thickness of 1 mm or less) which stably imparts flame resistance of V-0 degree. There were problems in that pollution of mold is serious since a large amount of gas is produced in molding and in that the molded article has low weld strength and is poor in toughness.

In the case of a molded flakiness article (for example, a molded article having a thickness of 1 mm or less), it is important to use a resin composition excellent in mechanical characteristic, especially toughness. For imparting a resin composition with toughness, it is general to add a polymer having low elasticity such as elastomer thereto as shown in Patent Document 3. However, since the addition of the elastomer decreases flame resistance of the resin composition, it is difficult to ensure both of toughness and flame resistance by such a method.

Patent Document 4 discloses that a particular organic phosphorous compound is used as a flame retardant and a flame retardant synergist is added thereto. Patent Document 4 exemplifies various kinds of flame retardant synergists, and some thereof are known as a flame retardant in itself. Since the flame retardant synergists that the document discloses cover a broad range from organic substance to inorganic substance, it is doubtful that all of those exert similar effects to each other.

For enhancing stiffness of a molded article, a fibrous reinforcement such as a glass fiber is added to a resin composition. However, there is a problem in that a molded article formed from the resin composition comprising such fibrous reinforcement easily burns since the fibrous reinforcement functions such as candlewick in burning thereof.

RELATED DOCUMENT

Patent Document

[Patent Document 1] JP-A-H8-73720
[Patent Document 2] JP-A-H11-60924
[Patent Document 3] JP-A-H7-150022
[Patent Document 4] WO2004/061008

DISCLOSURE OF INVENTION

Problems to be Resolved by the Invention

The invention is achieved in view of the above-mentioned related art, and the object of the invention is to provide a resin composition which has high level of flame retardant even if no halogen series flame retardant is used and has desired mechanical strength.

Particularly, the first object of the invention is to provide a flame-retardant thermoplastic resin composition which comprises a fibrous reinforcement and a calcium salt or aluminium salt of phosphine acid in addition to a thermoplastic polyester resin and which is excellent in mechanical properties and flame resistance.

The second object of the invention is to provide a thermoplastic polyester resin composition which does not comprise any halogen series flame retardant and which exerts excellent flame resistance even if fabricated to a molded article having a thickness of 1 mm or less. Especially, the object of the invention is to provide a thermoplastic polyester resin composition which is imparted with high degree of flame resistance, which has excellent toughness, and which further has high degree of tracking resistance, friction and abrasion resistance and mold release performance.

Means of Solving the Problems

The inventors of the invention have earnestly investigated and found that the above problems can be solved by comprising a calcium salt or aluminium salt of phosphine acid as a flame retardant and a particular organosiloxane to a thermoplastic polyester resin.

Particularly, in order to solve the above first object, it was found that a resin composition which is excellent in flame resistance and mechanical properties and which has a good balance for properties can be obtained by further blending an organosiloxane compound comprising an aryl group and a metal borate to a thermoplastic polyester resin to which a fibrous reinforcement and a calcium salt or aluminium salt of phosphine acid as a flame retardant are blended, and thereby, the invention was completed.

Particularly, in order to solve the second object, it was found that a resin composition which is excellent in toughness without decreasing its flame resistance can be obtained by, as a flame retardant, blending an aluminium salt or calcium salt of phosphine acid, preferably an aluminium salt or calcium salt of phosphine acid and a salt of an amino group-containing triazine, to a thermoplastic polyester resin, and further blending an organosiloxane polymer which is in the form of solid at room temperature thereto. The resin composition can be excellent in tracking resistance and other characteristics.

Specifically, the above problem was solved by the following means.

[1] A thermoplastic polyester resin composition comprising 100 parts by weight of a thermoplastic polyester resin (A), 5 to 40 parts by weight of a phosphinate (B), and an organosiloxane (X);

wherein the phosphinate (B) is a calcium salt or aluminium salt of phosphine acid of which the anion part is represented by the formula (1) or (2);

[Chemical 1]

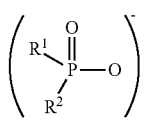

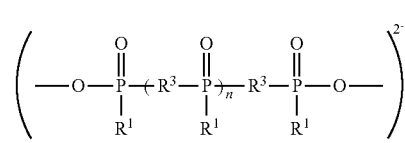

wherein $R^1$'s and $R^2$'s each independently are an alkyl group having 1 to 6 carbon atoms, or an aryl group which may have a substituent; $R^1$'s may be the same or different to each other; $R^3$'s are an alkylene group having 1 to 10 carbon atoms, an arylene group which may have a substituent, or a combination of at least two thereof; $R^3$'s may be the same or different to each other; and n is an integer of 0 to 4; and which, as the organosiloxane (X), comprises 1.5 to 10 parts by weight of an organosiloxane compound (X-1) or 0.01 to 5 parts by weight of an organosiloxane polymer (X-2), relative to 100 parts by weight of the thermoplastic polyester resin (A), wherein the organosiloxane compound (X-1) comprises organic groups bonding to a silicon atom directly or through an oxygen atom, and 40 mole % or more of the organic groups are an aryl group, and the organosiloxane polymer (X-2) is in the form of solid at 25° C.

[2] The thermoplastic polyester resin composition according to Claim 1, which, as the organosiloxane (X), comprises the organosiloxane compound (X-1) comprising organic groups bonding to a silicon atom directly or through an oxygen atom, wherein 40 mole % or more of the organic groups are an aryl group; and which further comprises 5 to 80 parts by weight of fibrous reinforcement (Y).

[3] The thermoplastic polyester resin composition according to [2], wherein the content of the phosphinate (B) is 20 to 35 parts by weight, relative to 100 parts by weight of the thermoplastic polyester resin (A).

[4] The thermoplastic polyester resin composition according to [2] or [3], wherein 50 mol % or more of the organic groups in the organosiloxane compound (X-1) are an aryl group.

[5] The thermoplastic polyester resin composition according to any one of [2] to [4], wherein the organosiloxane compound (X-1) has a weight-average molecular weight of 200 to 10000.

[6] The thermoplastic polyester resin composition according to any one of [2] to [5], wherein the organosiloxane compound (X-1) comprises the structural unit represented by $RSiO_{1.5}$, wherein R represents an organic group, and the content of hydroxy groups in organosiloxane compound (X-1) is 1 to 10% by weight.

[7] The thermoplastic polyester resin composition according to any one of [2] to [6], wherein the content of the organosiloxane compound (X-1) is 2 to 7 parts by weight, relative to 100 parts by weight of the thermoplastic polyester resin (A).

[8] The thermoplastic polyester resin composition according to any one of [1] to [7], which further comprises 20 parts by weight or less of a metal borate (E), relative to 100 parts by weight of the thermoplastic polyester resin (A).

[9] The thermoplastic polyester resin composition according to [8], which comprises 20 to 70 parts by weight of the fibrous reinforcement (Y); and
wherein the content of the metal borate (E) is 1 to 5 parts by weight, relative to 100 parts by weight of the thermoplastic polyester resin (A).

[10] The thermoplastic polyester resin composition according to [8], which comprises 20 to 35 parts by weight of a calcium salt or aluminium salt of phosphine acid of which the anion part is represented by the formula (1') or (2') as the phosphinate (B), 2 to 7 parts by weight of the organosiloxane compound (X-1) comprising organic groups bonding to a silicon atom directly or through an oxygen atom, wherein 50 mol % or more of the organic groups are an aryl group, as the organosiloxane compound (X), 20 to 70 parts by weight of the fibrous reinforcement (Y), and 1 to 5 parts by weight of the metal borate (E), relative to 100 parts by weight of the thermoplastic polyester resin (A);

[Chemical 3]

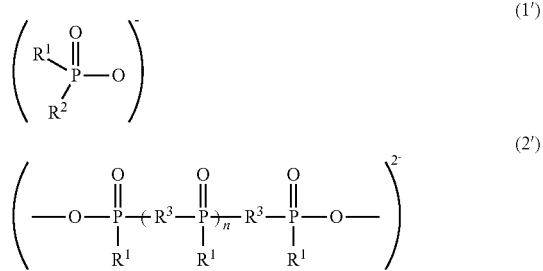

wherein $R^1$'s and $R^2$'s each independently are an alkyl group having 1 to 4 carbon atoms, $R^1$'s may be the same or different to each other; $R^3$'s are an alkylene group having 1 to 4 carbon atoms or phenylene group; $R^3$'s may be the same or different to each other; n is an integer of 0 to 4.

[11] The thermoplastic polyester resin composition according to [1], which, as the organosiloxane (X), comprises the organosiloxane polymer (X-2) in the form of solid at 25° C.

[12] The thermoplastic polyester resin composition according to [11], which further comprises 35 parts by weight or less of an amino group-containing triazine (C), relative to 100 parts by weight of the thermoplastic polyester resin (A).

[13] The thermoplastic polyester resin composition according to [11], which further comprises 2 to 30 parts by weight of a salt of an amino group-containing triazine (C), relative to 100 parts by weight of the thermoplastic polyester resin (A); and wherein the content of the phosphinate (B) is 7 to 35 parts by weight, and the content of the organosiloxane polymer (X-2) in the form of solid at 25° C. is 0.5 to 4 parts by weight.

[14] The thermoplastic polyester resin composition according to [12] or [13], wherein the ratio by weight of the amino group-containing triazine (C) to the phosphinate (B) ((C)/(B)) is in the range of 0.3 to 1.5.

[15] The thermoplastic polyester resin composition according to any one of [11] to [14], wherein the organosiloxane polymer (X-2) in the form of solid at 25° C. is selected from the group consisting of an organosiloxane polymer supported with an inorganic particle (X-2-1), an organosiloxane polymer having a softening point of higher than 25° C. (X-2-2), a cross-linked organosiloxane (X-2-3), and a polyorganosiloxane core graft copolymer (X-2-4).

[16] The thermoplastic polyester resin composition according to any one of [11] to [14], wherein the organosiloxane polymer (X-2) in the form of solid at 25° C. is an organosiloxane polymer supported with silica having a specific surface area of 50 $m^2$/g or more.

[17] The thermoplastic polyester resin composition according to [16], wherein the organosiloxane polymer (X-2) comprises a functional group.

[18] The thermoplastic polyester resin composition according to [16] or [17], wherein 0.4 to 4 parts by weight of the organosiloxane polymer is supported with 1 part by weight of the silica.

[19] The thermoplastic polyester resin composition according to any one of [11] to [14], wherein the organosiloxane polymer (X-2) in the form of solid at 25° C. is a silicone resin having a softening point of higher than 25° C.

[20] The thermoplastic polyester resin composition according to any one of [11] to [14], wherein the organosiloxane polymer (X-2) in the form of solid at 25° C. is silicone elastomer powder.

[21] The thermoplastic polyester resin composition according to any one of [11] to [14], wherein the organosiloxane polymer (X-2) in the form of solid at 25° C. is a polyorganosiloxane core graft copolymer.

[22] The thermoplastic polyester resin composition according to any one of [11] to [21], which further comprises 150 parts by weight or less of a fibrous reinforcement (Y), relative to 100 parts by weight of the thermoplastic polyester resin (A).

[23] The thermoplastic polyester resin composition according to any one of [1] to [22], wherein the thermoplastic polyester resin (A) is polyethylene terephthlate or polybutylene terephthalate.

[24] The thermoplastic polyester resin composition according to any one of [1] to [23], wherein the thermoplastic polyester resin is polybutylene terephthalate.

[25] A molded article formed from the thermoplastic polyester resin composition according to any one of [1] to [24] through injection-molding.

Effect of the Invention

The invention can provide a molded article which ensures high level of flame resistance without using a halogen series flame retardant and which meets the demanded performance as mentioned above.

EMBODIMENT FOR CARRYING OUT THE INVENTION

Contents of the present invention will be detailed below. Note that a word " . . . to . . . " in this specification will be used to indicate a range including the lower and upper limits represented by the numerals given therebefore and thereafter, respectively.

The resin composition of the invention comprising 100 parts by weight of a thermoplastic polyester resin (A), 5 to 40 parts by weight of a phosphinate (B), and an organosiloxane (X);
wherein the phosphinate (B) is a calcium salt or aluminium salt of phosphine acid of which the anion part is represented by the formula (1) or (2);
which comprises, as the organosiloxane (X), 1.5 to 10 parts by weight of an organosiloxane compound (X-1) or 0.01 to 5 parts by weight of an organosiloxane polymer (X-2), relative to 100 parts by weight of the thermoplastic polyester resin (A); and wherein the organosiloxane compound (X-1) comprises organic groups bonding to a silicon atom directly or through an oxygen atom, wherein 40 mole % or more of the organic groups are an aryl group, and the organosiloxane polymer (X-2) is in the form of solid at 25° C.

[Chemical 4]

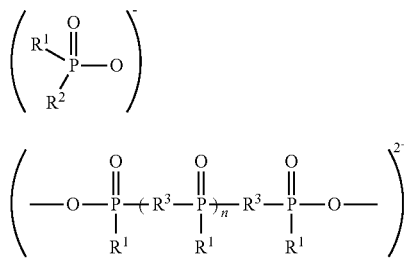

wherein $R^1$'s and $R^2$ each independently are an alkyl group having 1 to 6 carbon atoms, or an aryl group which may have a substituent; $R^1$'s may be the same or different to each other; $R^3$'s are an alkylene group having 1 to 10 carbon atoms, an arylene group which may have a substituent, or a combination of at least two thereof; $R^3$'s may be the same or different to each other; and n is an integer of 0 to 4.

By using such a composition, obtainable is a resin composition excellent in mechanical strength while ensuring its flame resistance even if a halogen series flame retardant is not substantially used (for example, the content thereof is 2% by weight or less, relative to the total amount of the composition).

In the invention, the first object is effectively achieved by using a thermoplastic polyester resin composition comprising 100 parts by weight of a thermoplastic polyester resin (A), 5 to 40 parts by weight of a phosphinate (B), 1.5 to 10 parts by weight of an organosiloxane compound (X-1), 5 to 80 parts by weight of a fibrous reinforcement (Y), and 0 to 20 parts by weight of a metal borate (E); wherein the phosphinate (B) is a calcium salt or aluminium salt of phosphine acid of which the anion part is represented by the formula (1) or (2); and the organosiloxane compound (X-1) comprises organic groups bonding to a silicon atom directly or through an oxygen atom, wherein 40 mole % or more of the organic groups are an aryl group, hereinunder may be referred to as "resin composition (1)". Hereinunder, the resin composition (1) of the invention is described in detail.

(A) Thermoplastic Polyester Resin:

The thermoplastic polyester resin (A) which is a main component of the resin composition (1) of the invention is a polyester obtainable through polycondensation of a dicarboxylic acid compound and a dihydroxy compound, polycondensation of oxycarboxylic acid compounds, or polycondensation of a mixture of those compounds, and may be any of homopolyester or copolyester. Examples of the dicarboxylic acid composing the thermoplastic polyester resin include aromatic dicarboxylic acids such as terephthalic acid, isophthalic acid, naphthalene dicarboxylic acid, diphenyidicarboxylic acid, diphenyl ether dicarboxylic acid, and diphenylethanedicarboxylic acid, alicyclic dicarboxylic acids such as cyclohexanedicarboxylic acid, and aliphatic dicarboxylic acids such as adipic acid and sebacic acid.

As those are well-known, those may be used for polycondensation reaction as an ester-forming derivative such as dimethyl ester in addition to a free acid. Examples of the oxycarboxylic acid include parahydroxybenzoic acid, oxynaphthoic acid, and diphenylenehydroxy acid. Those may be subject to polycondensation singly, but generally a small amount of the oxycarboxylic acid is used as a combination with the dicarboxylic acid.

The dihydroxy compound is generally exemplified by aliphatic diols such as ethylene glycol, propylene glycol, butanediol, neopentyl glycol, and polyoxy alkylene glycol, but it may be aromatic diols such as hydroquinone, resorcinol, naphthalenediol, dihydroxydiphenyl ether, and 2,2-bis(4-hydroxyphenyl) propane, and alicyclic diols such as cyclohexanediol.

In addition to such a bifunctional compound, may be used a small amount of a polyfunctional compound having three or more functional groups such as trimellitic acid, trimesic acid, pyromellitic acid, pentaerythritol and trimethylolpropane for introducing a branch structure, or a small amount of monofunctional compound such as fatty acid for adjusting the molecular weight.

In general, the thermoplastic polyester resin for use in the invention is generally composed of a polycondensation mainly consisting of dicarboxylic acid compound and dihydroxy compound, that is, the content of the structure unit based on the calculation of ester composed of the dicarboxylic acid compound and the dihydroxy compound is preferably 70% by weight or more, more preferably 90% by weight or more, relative to a total amount of all the resin. The dicarboxylic acid compound is preferably an aromatic dicarboxylic acid and the dihydroxy compound is preferably an aliphatic diol.

Of those, preferred is a polyalkylene terephthalate in which 95% or more of acid component is terephthalic acid and 95% or more of alcohol component is polyalkylene terephthalate as an aliphatic diol. The typical resin thereof is polybutylene terephthalate and polyethylene terephthalate. Those are preferably a near-homoester resin, that is, a resin in which 95% by weight or more component is composed of terephthalic acid component and one component of 1,4-butanediol component and ethylene glycol component.

In the composition of the invention, its glow wire performance can be enhanced by adding polyethylene terephthalate into polybutylene terephthalate without decreasing electric insulating performance.

The inherent viscosity of the thermoplastic polyester resin may be suitably determined, but, in general, is preferably 0.5 to 2 dl/g. Of those, it is more preferably 0.6 to 1.5 dl/g from the viewpoints of the moldability and the mechanical characteristics of the resin composition (1). When the resin composition comprises a resin comprising an inherent viscosity of less than 0.5 dl/g, then a molded article obtained from the resin composition (1) may be poor in mechanical strength. When the resin composition comprises a resin comprising an inherent viscosity of more than 2 dl/g, then the flowability of the resin composition (1) may reduce to decrease the moldability.

In the specification, the inherent viscosity of polyester resin is measured in a mixture solvent of tetrachloroethane and phenol at a ratio by weight of 1:1 at 30° C.

(B) Phosphinate:

The phosphinate for use in the invention is a phosphinate in which the anion part is represented by the formula (1) or (2) and the cation part is calcium or aluminium.

[Chemical 5]

-continued

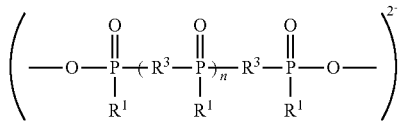
(2)

wherein R¹'s and R² each independently are an alkyl group having 1 to 6 carbon atoms, or an aryl group which may have a substituent; R¹'s may be the same or different to each other; R³'s are an alkylene group having 1 to 10 carbon atoms, an arylene group which may have a substituent, or a combination of at least two thereof; R³'s may be the same or different to each other; and n is an integer of 0 to 4.

The alkyl group which R¹ or R² may be is exemplified by methyl group, ethyl group, propyl group, isobutyl group and pentyl group, and is preferably an alkyl group having 1 to 4 carbon atoms, especially preferably methyl group or ethyl group. The aryl group is exemplified by phenyl group and naphthyl group, and the substituent bonded thereto is exemplified by an alkyl group having 1 to 4 carbon atoms or an alkoxy group having 1 to 4 carbon atoms such as methyl group, ethyl group, methoxy group and ethoxy group.

The number of the substituent to be bonded is generally 1 to 2. The aryl group is preferably a phenyl group to which one or two of alkyl groups having 1 to 2 carbon atoms may be bonded.

The alkylene group which R³ may be is exemplified by linear alkylene groups such as methylene group, ethylene group, propylene group and butylene group, and branched alkylene groups such as 2-ethylhexylene. Of those, more preferable is an alkylene group having 1 to 4 carbon atoms, especially methylene group or ethylene group.

The arylene group is exemplified by phenylene group and naphthylene group, and the substituent bonded thereto is the same as those as above mentioned. The number of the substituent to be bonded is generally 1. The arylene group is preferably a phenylene group to which one or two of alkyl groups having 1 to 2 carbon atoms are bonded. The combination of at least two thereof is exemplified by a group in which methylene group bonds to phenylene group, a group in which two phenylene groups bond to methylene group, and a group in which two methylene groups bond to phenylene group.

In the invention, of those, the above mentioned phosphinate is preferably a calcium salt or aluminium salt of phosphine acid of which the anion part is represented by the following formula (1') or (2').

[Chemical 6]

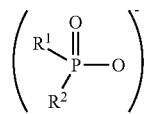
(1')

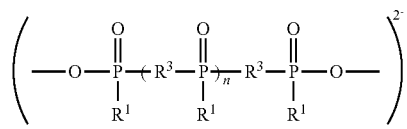
(2')

wherein R¹'s and R²'s each independently are an alkyl group having 1 to 4 carbon atoms, R¹'s may be the same or different to each other; R³'s are an alkylene group having 1 to 4 carbon atoms or phenylene group; R³'s may be the same or different to each other; n is an integer of 0 to 4.

The content of the phosphinate is 5 to 40 parts by weight, relative to 100 parts by weight of the thermoplastic polyester resin (A). When the content thereof is less than 5 parts by weight, then it is difficult to sufficiently enhance the flame resistance of the resin composition (1). When the content thereof is more than 40 parts by weight, then the mechanical performances reduces. In view of achievement of both of the flame resistance and mechanical properties, the content thereof is preferably 7 to 35 parts by weight, more preferably 10 to 35 parts by weight, further more preferably 20 to 35 parts by weight.

The phosphinate preferably used in the invention has the anion part represented by the formula (1'), and is exemplified by calcium dimethyl phosphinate, aluminium dimethyl phosphinate, calcium ethylmethyl phosphinate, aluminium ethylmethyl phosphinate, calcium diethyl phosphinate, aluminium diethyl phosphinate, methyl-n-propyl calcium phosphinate, methyl-n-propyl aluminium phosphinate, calcium methylphenyl phosphinate, aluminium methylphenyl phosphinate, and aluminium diisobutyl phosphinate.

The phosphinate in which the anion part is represented by the formula (2') is preferably the anion part in which n=0 in the formula (2') and is exemplified by calcium methylenebis (methylphosphinic acid), aluminium methylenebis(methylphosphinic acid), calcium phenylene-1,4-bis(methylphosphinic acid), and aluminium phenylene-1,4-bis (methylphosphinic acid).

The phosphinate for use in the invention may be used singly or in combination of two or more kinds thereof at a desired ratio. Specifically, of those, more preferable is an aluminium or calcium salt of diethyl phosphine acid from the viewpoints of the flame resistance and the electric characteristics. From the viewpoints of the mechanical strength and the appearance of the molded article obtained from the resin composition (1) of the invention, the phosphinate for use in the invention is preferably in the form of powder, and 90% by weight or more of the phosphinate in the form of powder has a particle diameter of 100 μm or less, especially 50 μm or less. Of those, 90% by weight or more of the phosphinate in the form of powder has a particle diameter of 0.5 to 20 μm is particularly preferable since the resin composition exerts the flame resistance at a higher degree, and the molded article obtained therefrom has extremely high toughness. The particle diameter is the value measured according to the laser diffractometry.

(X-1) Organosiloxane Compound:

The thermoplastic polyester resin composition (1) of the invention indispensably comprises an organosiloxane compound having an aryl group. The organosiloxane compound functions as a flame retardant which imparts the thermoplastic resin composition (1) with high flame resistance when it is used in combination with the above mentioned phosphinate.

One of functional mechanisms is believed that, when the resin composition (1) is burned, the organosiloxane compound therein vaporizes to form many minute air bubbles in the resin composition (1) and the air bubbles prevent the resin composition (1) from further burning by its heat insulating function.

The organosiloxane compound for use in the invention is an organic silanol or a polymer obtained from the organic silanol, wherein 40 mole % or more, preferably 50 mole % or more, of the organic groups bonding to a silicon atom directly or through an oxygen atom, that is, the organic group constituting Si—C or Si—O—C bond has an aryl group. The aryl group is exemplified by phenyl group or naphthyl group which may be substituted with 1 to 2 of alkyl groups having 1 to 4 carbon atoms or alkoxy groups having 1 to 4 carbon atoms such as methyl group, ethyl group, methoxy group and ethoxy group. Of those, the aryl group is preferably a phenyl group.

In general, the resin composition (1) comprising the organosiloxane compound readily causes dripping during burning, but the resin composition (1) comprising the organosiloxane compound in which 40 mole % or more of the organic groups are an alkyl group hardly causes the dripping during burning, and the burning is suppressed to a large degree. Those functions that the organosiloxane compound has are generally more effective when the content of the aryl group in the organic group is higher. Thus, the organosiloxane compound is preferably an organosiloxane in which 80 mole % of the organic groups are an aryl group, further preferably an organosiloxane in which all (100%) of the organic groups are an aryl group. particularly, a phenyl group.

As the organosiloxane compound, may be usable any of monomers such as triphenylsilanol, oligomers as cyclic tetrameric of the monomers such as octaphenyltetrasiloxane or polymers such as polydiphenylsiloxane. Some of the phenyl groups may be substituted with methyl group or another alkyl group, methoxy group or another alkoxy group, or phenoxy group or another aryloxy group.

Further, the phenyl group may be substituted in its part with hydroxy group. However, when the content of the hydroxy group in the organosiloxane compound is too large, then it readily hydrolyzes under high temperature and high humidity. Therefore, the content of the hydroxy group therein is preferably 1 to 10% by weight.

As mentioned above, the organosiloxane compound may be a monomer or an oligomer. However, since the organosiloxane compound having a low molecular weight readily causes mold deposit, it is preferably a polymer having a weight-average molecular weight of 200 or more, more preferably 800 or more, particularly preferably 1000 or more. When the molecular weight thereof is too large, then it may be difficult to prepare a uniform resin composition (1) since its compatibility with the polyester resin reduces. Thus, the weight-average molecular weight thereof is preferably 10000 or less, more preferably 5000 or less. Herein, the weight-average molecular weight is a value in terms of polystyrene measured according to the gel permeation chromatography (GPC).

Of the organosiloxane compound, particularly preferred is, as it is called, a silicone resin. The silicone resin is generally a polymer composed of the following D unit, T unit, Q unit or the like. The terminal thereof may be sealed with the following M unit.

[Chemical 7]

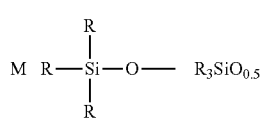

(3)

[Chemical 8]

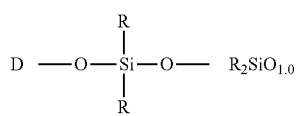

(4)

[Chemical 9]

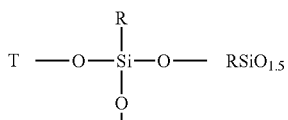

(5)

[Chemical 10]

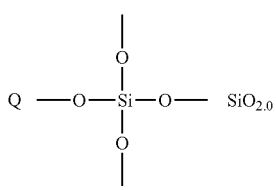

(6)

The silicone resin for use in the invention preferably comprises the T unit represented by $RSiO_{1.5}$. In particular, the content of the T unit in the silicone resin is preferably larger, and is preferably 50 mole % or more, further preferably 80 mole % or more. Particularly preferably, the silicone resin consists of only the T unit except a terminal-blocking group.

In general, for a silicone resin comprising a smaller amount of the T unit, the heat resistance itself is lower and the dispersibility in the resin composition (1) is lower. The content ratio of the T unit is a value measured according to $^{29}$Si-NMR, that is, a value calculated from a peak area derived from the T unit in the measurement.

In the formulae (3) to (6), R's represent a monovalent hydrocarbon group having 1 to 12 carbon atoms. R's may be the same or different to each other, and is generally an alkyl group having 1 to 12 carbon atoms, an alkenyl group having 2 to 12 carbon atoms, or an aryl group having 6 to 12 carbon atoms.

Examples of the alkyl group include methyl group, ethyl group, n-propyl group, isopropyl group, butyl group, hexyl group, octyl group, and dodecyl group. Of those, preferred is methyl group. Examples of the alkenyl group include vinyl group, butenyl group, and aryl group. Examples of the aryl group include phenyl group, biphenyl group, naphthyl group, and tolyl group. Of those, preferred is phenyl group. To the aryl group, may be bonded to one or two of alkyl groups having 1 to 4 carbon atoms or alkoxy groups having 1 to 4 carbon atoms such as methyl group, ethyl group, methoxy group, or ethoxy group.

In the above formula, the oxygen atom in Si—O— bonds to a hydrogen atom or a hydrocarbon group to form a hydroxyl group or a hydrocarbonoxy group, or two Si-Ov's bond to form a Si—O—Si bond. The hydrocarbon group bonding to the oxygen atom is exemplified by the hydrocarbon groups which are the same as R in the above formula.

In the invention, of the above mentioned silicone resin, silicon resin in which 40 mole % or more, preferably 50 mole % or more, of the organic groups bonding to a silicon atom directly or through an oxygen atom is preferable, that is, the organic group forming Si—C or Si—O—C bond is an aryl group which may have a substituent, preferably a phenyl group, is preferable.

When the content of the aryl group therein is less than 40 mole %, then the silicone resin has low compatibility with the thermoplastic resin, and therefore, the obtained resin composition (1) may not have a desired high flame resistance. Thus, the content of the aryl group in the organic group is preferably 80 mole % or more, more preferably 100 mole % or more. The content of the aryl group may be measured according to $^{29}$Si-NMR, and may be calculated from a peak area derived from aryl-Si and Si—O-aryl.

The flame resistance of the silicone resin may be improved by comprising a small amount of hydroxy group. The content of hydroxy group is preferably 1 to 10% by weight, preferably 2 to 8% by weight, to the total amount of the silicone resin. The silicone resin may be used singly or in combination of two or more kinds thereof at a desired ratio.

The content of the organosiloxane compound is preferably 1.5 to 10 parts by weight, more preferably 2 to 7 parts by weight, relative to 100 parts by weight of the thermoplastic polyester resin. When the content thereof is too small, then the resin composition does not have a desired flame resistance. When the content is too large, then the flame resistance thereof reduces. This is believed that, when the content of the organosiloxane compound in the resin composition (1) is larger, vaporized organosiloxane compound itself burns while the resin composition (1) burns to decrease the flame resistance thereof.

(Y) Fibrous Reinforcement:

As the fibrous reinforcement, may be usable suitable whisker which is conventionally known such as basalt fiber and potassium titanate fiber in addition to glass fiber and carbon fiber which are used for improving mechanical characteristics such as toughness and the like by adding it to thermoplastic resin. Of those, preferable are glass fiber and carbon fiber.

The fibrous reinforcement having a too thick diameter decreases flexibility. The fibrous reinforcement having a too thin diameter such as a diameter less than 1 μm is difficult to obtain a large amount thereof and is hardly used in chemical industry. Thus, the diameter thereof is preferably 1 to 100 μm, preferably 2 to 50 μm. In particular, the average diameter is preferably 3 to 30 μm, more preferably 5 to 20 μm from the viewpoints of easy availability and sufficient effectiveness for reinforcement. The fibrous reinforcement generally has a circular cross-section, but may have a modified cross-section such as cocoon type or flat cross-section.

The length of the fibrous reinforcement is preferably 0.1 mm or more from the viewpoint of stiffening effect. In general, while a fibrous reinforcement having a longer length has larger stiffening effect, it was broken to be short due to melt kneading for preparing the resin composition (1). Thus, even if a fibrous reinforcement having a length of 20 mm or more is used, the effective thereof is generally low, and therefore, the fibrous reinforcement having a length of 0.3 to 5 mm is generally used. Many of the fibrous reinforcement are generally made a bundle of, and the bundle is cut to have a desired length to form chop strands which are used for preparation of the resin composition (1). The addition of carbon fiber gives conductive property to the resin composition (1), and therefore, glass fiver may be used when the resin composition (1) having high electrical resistance is desired.

In the resin composition (1) of the invention, the fibrous reinforcement is added in an amount of 5 to 80 parts by weight, relative to 100 parts by weight of polyester resin. When the content thereof is less than 5 parts by weight, then the stiffening effect is small. When the content thereof is more than 80 parts by weight, then the mechanical characteristics such as impact resistance of the resin composition (1) reduce. The content thereof of the fibrous reinforcement is preferably 20 to 70 parts by weight.

(E) Metal Borate:

In the invention, in addition to the above mentioned (A) to (D), metal borate may be further added. Boric acid to form the metal borate is preferably a non-condensed type boric acid such as orthoboric acid and metaboric acid, a condensed type boric acid such as pyroboric acid, tetraboric acid, pentaboric acid and octaboric acid and a basic boric acid. The metal which forms a salt therewith may be an alkali metal, but is preferably a polyvalent metal such as an alkali earth metal, a transition metal, and a metal in 2B group of the periodic system. The metal borate may be a hydrate.

The metal borate is classified by a non-condensed type borate salt or a condensed type borate salt. Examples of the non-condensed type metal borate include alkali metal borates such as calcium orthoboric acid and calcium metaboric acid; transition metal borates such as manganese orthoboric acid and manganese methaboric acid, metal borates in 2B group of the periodic system such as zinc metaborate and cadmium metaborate. Of those, metaborate is preferable.

Examples of the condensed type borate include alkali metal borates such as tri magnesium tetra borate and calcium pyroborate, transition metals such as manganese tetraborate and nickel diborate, metal borates in 2B group of the periodic system such as zinc tetraborate, and cadmium tetraborate. Examples of the basic borate include metal borates in 2B group of the periodic system such as basic zinc borate and basic cadmium borate. Hydrogen borates corresponding to those borates, for example manganese hydrogen orthoborate, may be also used.

The metal borate for use in the invention is preferably an alkali metal borate and a metal borate in 2B group of the periodic system, specifically zinc borates and calcium borates. The zinc borates include zinc borate ($2ZnO.3B_2O_3$), zinc borate and the like, and the calcium borates include calcium borate anhydride ($2CaO.3B_2O_3$) and brunt calcium borate. Those zinc borates and calcium borates are particularly preferably a hydrate.

By adding the metal borate, the resin composition (1) is further prevented from burning. In the phenomenal fact, the metal borate foams to shut un-burned part from blaze at the time of burning. The content of the metal borate is 0 to 20 parts by weight, and is preferably 1 part by weight or more, relative to 100 parts by weight of the thermoplastic polyester resin. When the amount of the metal borate is excessively add, then the improved effect corresponding to the increase of the content thereof is plateaued. Thus, the content of the metal borate is preferably 1 to 10 parts by weight, more preferably 1 to 5 parts by weight, relative to 100 parts by weight of the thermoplastic polyester resin.

The dripping at the time of burning may be further prevented by adding polytetrafluoroethylene obtained through suspension polymerization method or fumed colloidal silica.

In the flame resistance polyester resin composition (1) of the invention, another thermoplastic resin may be used secondarily. The resin available to the invention may be a resin which is stable under high temperature. Specific examples thereof include polycarbonate, polyamide, polyphenylene oxide, polystyrene series resin, polyphenylene sulfide ethylene, polysulphone, poly ether sulphone, polyetherimide, polyether ketone, and fluoro resin.

On the other hand, the above-mentioned second object is effectively achieved by employing a thermoplastic resin composition (hereinunder, may be referred to as "resin composition (2)") which is characterized by comprising 5 to 40 parts by weight of phosphinate (B), 0 to 35 parts by weight of a salt of an amino group-containing triazine (c), 0.01 to 5 parts by weight of an organosiloxane polymer (X-2), and 0 to 150 parts of a fibrous reinforcement (which may be referred as filler reinforcement), relative to 100 parts by weight of the thermoplastic polyester resin (A), wherein the phosphinate (B) is a calcium salt or aluminium salt of phosphine acid of which the anion part is represented by the formula (1) or (2); and the organosiloxane polymer (X-2) is in the form of solid at 25° C. Hereinunder, the resin composition (2) of the invention is described in detail.

Hereinunder, the resin composition of the invention is described in detail.

(A) Thermoplastic Polyester Resin

The thermoplastic polyester resin is the same as the thermoplastic polyester resin (A) mentioned in the above resin composition (1), and the preferable scope thereof is the same. However, in the resin composition (2), the thermoplastic polyester resin preferably comprises a structural unit as an ester composed of a dicarboxylic acid compound and a dihydroxy compound in the amount of 50% parts by weight or more, more preferably 70% parts by weight or more, relative to all resin components.

(B) Phosphinate:

The phosphinate is the same as the (B) phosphinate mentioned in the above resin composition (2), and the preferable scope thereof is the same.

(C) Salt of Amino Group-Containing Triazine

The amino group-containing triazines which forms a salt of an amino group-containing triazine as a nitrogen series flame retardant (amino group-containing triazines) is generally an amino group-containing 1,3,5-triazine, and is concretely exemplified by melamine, melamines having a substituent such as 2-methylmelamine and guanyl melamine, melamine condensations such as melame, melem and merone, polycondensation resins of melamine such as melamine-formaldehyde resin, amides of cyanuric acid such as ammeline and ammelide, and guanamines and its derivatives (guanamine, methylguanamine, acetoguanamine, benzoguanamine, succinic guanamine, adipo guanamine, phthalonic quanamine, CTU-guanamine).

Acids to form a salt with those triazines may be an inorganic acid or an organic acid. The inorganic acid is concretely exemplified by nitric acid, chloric acids such as chloric acid and hypochlorous acid, phosphoric acids such as phosphoric acid, phosphorous acid, phosphinic acid and polyphosphoric acid, sulfuric acids such as non-condensing sulfuric acid (sulfuric acid and sulfurous acid) and condensation sulfuric acids (peroxso disulfuric acid and pyrosulfuric acid), boric acid, chromic acid, antimonic acid, molybdic acid, and tungstic acid. Of those, preferred are phosphoric acid and sulfuric acid.

The organic acid is exemplified by organic sulfuric acids (aliphatic sulfonic acids such as methanesulfonic acid, and aromatic sulfonic acids such as toluene sulfonic acid and benzene sulfonic acid) and cyclic ureas (uric acid, barbituric acid, cyanuric acid, acethylene urea, and the like). Of those, preferred are alkanesulfonic acids having 1 to 4 carbon atoms such as methanesulfonic acid, aryl sulfonic acids which may have an alkyl group having 1 to 3 carbon atoms such as toluenesulfonic acid, and cyanuric acid.

The salt of an amino group-containing triazine is exemplified by cyanuric acid melamine.melame.melem double salt, melamine phosphates (melamine polyphosphorate, melamine polyphosphorate.melame.melem double salt, etc.), melamine sulfurate (melamine sulfurate, dimelamine sulfuric acid, dimelame pyrosulfuric acid, etc.), melamine sulfonate (melamine methanesulfonate, melame methanesulfonic acid, melem methanesulfonic acid, melamine methanesulfonate.melame.melem double salt, melamine toluenesulfonate, melame toluensulfonic acid, melamine toluenesulfonate.melame.melem double salt, etc.). Two or more kinds of those salts of amino group-containing triazines may be combined.

Of the nitrogen series flame retardants, preferred is adduct of cyanuric acid or iscyanuric acid to a triazine series compound. The composition of the adduct thereof is generally 1:1 (molar ratio), possibly 1:2 (molar ratio).

More preferable are melamine cyanurate, benzogamine cyanurate, aceto guanamine cyanurate, and further more preferable is melamine cyanurate.

In general, those salts are obtained in the form of powder by a known method. For example, these salts may be obtained by preparing water slurry of a mixture of a triazine compound with cyanuric acid or isocyanuric acid, mixing the both salts to form particles, filtering the slurry and drying the slurry.

Thus obtained salts may not be completely pure, and the unreacted triazines and cyanuric acid or isocyanuric acid may remain. From the viewpoints of the flame resistance, the mechanical strength, the heat and humidity resistance, the retention stability and the surface characteristics of the molded article, the salt before incorporated into the resin preferably has an average particle diameter of 100 to 0.01 μm, more preferably 80 to 1 μm at a ratio of 90% by weight. The average particle diameter is measured according to the laser diffractometry. In the case where the above mentioned salt does not have sufficient dispersibility, a dispersant such as tris(beta-hydroxyethyl)isocyanurate or a known surface treatment agent may be combined with the salt.

The content of the salt of an amino group-containing triazine in the invention is preferably 0 to 40 parts by weight, more preferably 2 to 30 parts by weight, relative to 100 parts by weight of the thermoplastic polyester resin. When the content thereof is more than 40 parts by weight, then the resin composition to be obtained tends to reduce in mechanical property. The ratio by weight of the content of the metal phosphinate (B) to the content of the salt of an amino group-containing triazine (c) is generally (C)/(B)–0 to 3. When the ratio by weight of the amounts to be added thereof is more than 3, then it becomes difficult to ensure the flame resistance of the obtained resin composition. Therefore, the ratio by weight is preferably 0.1 to 2, more preferably 0.3 to 1.5.

In order to improving dispersibility of the metal phosphinate and the salt of an amino group-containing triazine, those ingredients may be treated with a dispersant, or a dispersant may be incorporated into the resin composition when the resin composition is produced. The preferable dispersant is exemplified by a liquid dispersant disclosed in JP-A-2004-269885.

The dispersant is exemplified by diols such as ethylene glycol and butanediol, isocyanates such as TDI and MDI, polyether polyols such as polyethyleneglycol, polyols such as polyester polyol, and epoxy resins such as bisphenol A glycidyl ester, and polyglycidyl ester of phenol-formaldehyde resin or cresol formaldehyde resin.

In order to improve the dispersibility in preparation of the resin composition, the flame retardant may be grained and then incorporated thereinto. For example, may be used a phosphinate grained with a binder such as disclosed in JP-A-2004-99893.

Preferable examples of the binder include alkyl alkoxylate, polyethyleneglycol, and waxes such as carnauba wax, montan wax, and polyethylene wax. The softening point of the binder is preferably 50 to 200° C. The content of the binder is preferably 0.5 to 10 parts by weight, relative to 100 parts by weight.

(X-2) Organosiloxane Polymer in the Form of Solid at 25° C.

The organosiloxane polymer means a polymer obtained from organosiloxane compounds or a copolymer obtained from an organosiloxane compound with a compound capable of reacting therewith (a vinyl compound, a carbonate compound, or the like). The form of solid at 25° C. means that a compound does not flow as liquid at 25° C. and can be handled as solid. Examples thereof include the following (X-2-1) to (X-2-4).
(X-2-1) An organosiloxane-supported inorganic particle
(X-2-2) A chain type-organosiloxane polymer having a softening point of higher than 25° C.
(X-2-3) A cross-linked-organosiloxane polymer
(X-2-4) A polyorganosiloxane core graft copolymer
(X-2-1) Organosiloxane-Supported Inorganic Particle (Hereinunder, May be Referred as Supported Polymer)

The inorganic particle is exemplified by silica powder, titanium oxide powder, mica powder, clay powder, kaoline powder, magnesium hydroxide powder and aluminium hydroxide powder, and is preferably silica powder. The silica powder includes dry-way silica and wet-way silica and both thereof may be used.

The inorganic particles preferably have a particle diameter of 0.01 to 100 μm, particularly preferably 0.01 to 30 μm at the ratio of 90% by weigh thereof, when measured according to the laser diffractometry. Of those, the inorganic particles are preferably powders having a specific surface area of 50 m$^2$/g or more, more preferably 100 m$^2$/g or more. The inorganic particles may be treated with a surface treatment agent such as a silane coupling agent, and such a treatment may further strengthen the bond with the organosiloxane polymer. When the polymer has an epoxy group or a methacryl group, then the bond may be further strengthened.

The organosiloxane polymer may be a polymer of organosiloxane compounds or a copolymer having a carbon chain as a copolymerization component in the molecular chain. The copolymerization component is exemplified by a saturated or unsaturated chain hydrocarbon group having carbon atoms of 1 to 20, a halogenated hydrocarbon group, an alicyclic hydrocarbon group and an aromatic hydrocarbon group. The organosiloxane polymer may have a functional group.

The functional group is preferably methacryl group or epoxy group. The polymer having those functional groups has good compatibility with the thermoplastic polyester resin, and therefore, it may be effective for improving the toughness. In addition, since the functional groups can cause a cross-linking reaction with the polyester resin during burning, decrease of the flame resistance is suppressed. The organosiloxane polymer may be linear or branched, and is preferably linear.

The content of the functional groups in the organosiloxane polymer is generally about 0.01 to 1 mole %, preferably 0.03 to 0.5 mole %, more preferably 0.05 to 0.3 mole %. The method for supporting the organosiloxane to the inorganic particle is suitably selected. For example, the method may comprise dissolving the polymer in a solvent, impregnating the inorganic particles into the polymer solution, and then drying it. The content to be supported of the organosiloxane is generally 0.1 to 10 g, preferably 0.4 to 4 g, relative to 1 g of the inorganic particles.

When the organosiloxane is supported by using, as an adhesion promoter, an alkoxy silane having a functional group such as an epoxy group and the like, then the bond between the inorganic particles and the polymer is further strengthened. The bond between the inorganic particles and the polymer may be merely a physical bond or a bond due to a chemical reaction. It is believed that the polymer supported by the inorganic particles forms a milder form of cross-link structure with the thermoplastic polyester resin through synergic action with the inorganic particles, and that the cross-link structure contributes improvement of both of the toughness thereof and the flame resistance thereof.

The supported polymer is preferably a supported polymer in which an organosiloxane polymer is supported on silica. Commercial products thereof include "Si powder" and "Torayfil F" manufactured by Dow Corning Toray Corporation.

(X-2-2) Organosiloxane Polymer Having a Softening Point of 25° C. or More

The typical organosiloxane polymer having a softening point of higher than 25° C. is, so-called, silicone resin, and the composition thereof is presented by the following formula (3)

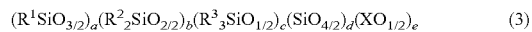
$(R^1SiO_{3/2})_a(R^2_2SiO_{2/2})_b(R^3_3SiO_{1/2})_c(SiO_{4/2})_d(XO_{1/2})_e$ (3)

In the formula (3), X is hydrogen atom or an alkyl group such as methyl group, ethyl group, propyl group, butyl group, pentyl group, hexyl group and heptyl group. $R^1$, $R^2$, and $R^3$ may be different to each other, and is preferably a hydrocarbon group or an organic group containing an epoxy group.

Examples of the hydrocarbon group include alkyl groups such as methyl group, ethyl group, propyl group, butyl group, pentyl group, hexyl group and heptyl group; alkenyl groups such as vinyl group, allyl group, butenyl group, pentenyl group and hexenyl group; aryl groups such as phenyl group, tolyl group, xylyl group and naphthyl group; aralkyl groups such as benzyl group and phenethyl group; and halogenated alkyl groups such as chloromethyl group, 3-chloropropyl group, 3,3,3-trifluoropropyl group and nonafluorobutylethyl group.

Examples of the organic group containing an epoxy group include epoxy alkyl groups such as 2,3-epoxypropyl group, 3,4-epoxy butyl group, and 4,5-epoxy pentyl group; glycidoxy alkyl groups such as 2-glycidoxy ethyl group, 3-glycidoxy propyl group, and 4-glycidoxy butyl group; epoxycycloalkyl groups such as 2-(3,4-epoxy cyclohexyl)ethyl group and 3-(3,4-epoxycyclohexyl)propyl group. Although the organic group containing an epoxy group is not essential, the content of the organic group containing an epoxy group in a total of $R^1$ to $R^3$ in the formula (3) is preferably 0.1 to 40 mole %.

When the content thereof is less than 0.1 mole %, then the bleeding-out tends to easily occur at the time when the thus-obtained resin composition is molded. When the content thereof is more than 40 mole %, then mechanical characteristic of the molded article tends to reduce.

When $R^1$, $R^2$, or $R^3$ has a phenyl group, the organosiloxane is excellent in affinity for the thermoplastic polyester resin. Therefore, 10 more % or more of all of $R^1$, $R^2$, and $R^3$ in the formula (3) are preferably phenyl group. Of those, 10 mole % or more of $R^1$ is preferably phenyl group, and 30 mole % or more of $R^1$ is particularly preferably phenyl group.

Further, the flame resistance thereof is enhanced by relaxing the steric hiderance of the organopolysiloxane containing a phenyl group, which has a large size, to enhance spatial freedom thereof, and thereby easily overlapping every phenyl groups. Therefore, $R^1$ in the formula (3) preferably has methyl group or vinyl group. The ratio of phenyl group in $R^1$ is preferably 10 to 95 mole %, more preferably 30 to 90 mole %.

In the formula (3), a is a positive number, b, c, d and e each are 0 or a positive number. b/a is a number of 0 to 10, c/a is a number of 0 to 0.5, d/(a+b+c+d) is a number of 0 to 0.3, e/(a+b+c+d) is a number of 0 to 0.4. A silicone resin having b/a of more than 10 has a softening point of 25° C. or less. The affinity thereof for the resin reduces. A silicon resin having d/(a+b+c+d) of more than 0.3 tends to decrease the dispersibility to the resin.

The weight-average molecular weight of the organopolysiloxane is preferably 500 to 50000, particularly preferably 500 to 10,000. The softening point thereof is 25° C. or more, preferably 40 to 250° C., more preferably 40 to 150° C. Use of the silicone resin having a softening point of less than 25° C. tends to cause bleeding to pollute the mold at the time of molding of the resin composition obtained by mixing it, or to decrease the mechanical characteristics of the molded articles. Or the silicone resin tends to bleed out on a surface of the molded article during long use of the molded article.

Use of the silicon resin having a too high softening point tends to make difficult uniform dispersion of the resin composition at the preparation of the resin composition. The softening point is determined as a temperature at which silicone resin is heated at a rate of temperature increase of 1° C./min using the micro softening point apparatus manufactured by Yanagimoto Mfg. Co., Ltd. and melts to change droplets.

The silicone resin represented by the formula (1) may, for example, be formed by reacting a mixture of one or more kinds of silane or siloxane with an epoxy group-containing alkoxy silane or its partial hydrolysate with a basic catalyst, wherein the silane or siloxane comprises at leas one unit selected from the group consisting of the unit represented by the formula (i): $R^4SiO_{3/2}$, wherein $R^4$ is a monovalence hydrocarbon group.), the unit represented by the formula (ii): $R^5{}_2SiO_{2/2}$, wherein $R^5$'s are a monovalent hydrocarbon group, and may be the same or different to each other), the unit represented by the formula (iii): $R^6{}_3SiO_{1/2}$, wherein $R^6$'s are a monovalent hydrocarbon group, and may be the same or different to each other), and the unit represented by the formula (iv): $SiO_{4/2}$; and the epoxy group-containing alkoxy silane is represented by the formula: $R^7R^8{}_fSi(OR^9)_{(3-f)}$, wherein $R^7$ is an epoxy group-containing organic group, $R^8$ is a monovalent hydrocarbon group, $R^9$ is an alkyl group, and f is 0, 1 or 2.

In the above method, the main component is a mixture of one or more kinds of silane or siloxane comprising at least one unit selected from the group consisting of the units represented by the above-mentioned (i) to (iv).

Examples of those silane or siloxane include methyltrimethoxy silane, methyltriethoxysilane, ethyltrimethoxysilane, ethyltriethoxysilane, vinyltrimethoxysilane, phenyltrimethoxysilane, 3,3,3-trifluoropropyltrimethoxysilane, dimethyldimethoxysilane, methylphenyldimethoxysilane, methylvinyldimethoxysilane, diphenyldimethoxysilane, dimethyldiethoxysilane, methylphenyldiethoxysilane, tetramethoxysilane, tetraethoxysilane, tetrapropoxysilane, dimethoxydiethoxysilane and hydrolyzed condensation thereof.

The epoxy group-containing alkoxy silane is represented by the formula: $R^7R^8{}_fSi(OR^9)_{(3-f)}$ which is copolymerized with those silane or siloxane or its partial hydrolysate is a component which incorporates an epoxy group into silicone resin. $R^7$ in the formula is an epoxy group-containing organic group, and is exemplified by the same epoxy group-containing organic groups as the above-mentioned $R^1$, $R^2$, or $R^3$.

$R^8$ in the formula is a monovalent hydrocarbon group and is exemplified by the same epoxy group-containing organic group as the above-mentioned $R^1$, $R^2$, or $R^3$. $R^9$ is an alkyl group, and is exemplified by methyl group, ethyl group, propyl group, butyl group, pentyl group, hexyl group, and heptyl group. In the formula, f is 0, 1, or 2, preferably 0.

The epoxy group-containing alkoxy silane is exemplified by 3-glycidyloxypropyl(methyl)dimethoxy silane, 3-glycidyloxypropyl(methyl)diethoxy silane, 3-glycidoxypropyl(methyl)dibutoxy silane, 2-(3,4-epoxycyclohexyl)ethyl(methyl)dimethoxysilane, 2-(3,4-epoxy cyclohexyl)ethyl(phenyl)diethoxysilane, 2,3-epoxypropyl(methyl)dimethoxysilane, 2,3-epoxypropyl(phenyl)dimethoxysilane, 3-glycidyloxypropyltrimethoxysilane, 3-glycidyloxypropyltributoxysilane, 2-(3,4-cpoxycyclohexyl)ethyltrimethoxy silane, 2-(3,4-epoxycyclohexyl)ethyltriethoxy silane, 2,3-epoxypropyltrimethoxy silane, and 2,3-epoxypropyltriethoxy silane.

Examples of the basic catalyst include hydroxides of an alkali metal such as sodium hydroxide, potassium hydroxide, and cesium hydroxide; alkoxides of an alkali metal such as sodium tert-butoxide, potassium tert-butoxide, and cesium tert-butoxide; and silanol compounds of alkali metal such as sodium silanol compound, potassium silanol compound, and cesium silanol compound. Preferably used are a potassium series or cesium series basic catalyst. In the reaction, water may be added if necessary.

In the reaction, an equilibrating reaction randomly causes cut and recombination between siloxane bonds, and as a result, the obtained epoxy group-containing silicone resin becomes an equilibrium state. When the reaction temperature is low, then the equilibrating reaction may not sufficiently progress. When the reaction temperature is too high, then the silicon atom-bonding organic group may be pyrolyzed. Therefore, the reaction temperature is preferably 80° C. to 200° C., more preferably 100° C. to 150° C.

By selecting an organic solvent having a boiling point of 80 to 200° C., the equilibrating reaction can easily be progressed at the reflux temperature thereof. The equilibrating reaction can be stopped by neutralizing the basic catalyst. For the neutralization, a weak acid such as carbon dioxide or carboxylic acid is preferably added thereto. The salt formed by the neutralization may be removed by filtering it or washing it with water.

(X-2-3) Cross-Linked Organosiloxane Polymer

The cross-linked organosiloxane is a so-called silicone elastomer which may be synthesized by curing it through an addition reaction, a condensation reaction, a radical reaction due to organic peroxide or an ultraviolet irradiation. Of those, preferred is a silicone elastomer cured through an addition reaction or a condensation reaction. More preferred is an addition reaction-cure-type silicone elastomer.

The addition reaction-cure-type silicone elastomer composition is a composition in which the elastomer is formed by bonding two kinds of functional groups in the organopolysiloxane to each other through an addition reaction to thereby form a cross-link. The typical examples thereof include a silicon elastomer composition comprising organopolysiloxane or organohydropolysiloxane containing an aliphatic unsaturated group such as vinyl group or hexynyl group, and a platinum group compound series catalyst.

Examples of the aliphatic unsaturated group-containing organopolysiloxane include dimethylpolysiloxane having vinyldimethylsiloxy groups at the both molecular chain terminals, dimethylsiloxane/methlvinylsiloxane copolymer having vinyldimethylsiloxy groups at the both molecular chain terminals, and dimethylsiloxane/methlphenylsiloxane copolymer having vinyl methylphenylsiloxy groups at the both molecular chain terminals.

Examples of organohydrogenpolysiloxanes include methylhydrogenpolysiloxane having trimethylsiloxy groups at the both molecular chain terminals, dimethylsiloxane/methylhydrogenpolysiloxane copolymer having trimethylsiloxy groups at the both molecular chain terminals, dimethylsiloxane/methylhydrogensiloxane copolymer having dimethylhydrogensiloxy groups at the both molecular chain terminals, and methyhydrogenpolysiloxane.

Examples of the platinum group compound series catalyst include platinum in the particle form, chloroplatinic acid, a complex of platinum and olefin, a complex of platinum and a vinyl siloxane, a complex of platinum and a diketone, a palladium compound catalyst and a rhodium compound catalyst. Of those, preferred is a platinum compound series catalyst from the viewpoint of the catalyst activity. The addition reaction-cure-type silicone elastomer composition is generally cured by heating from the viewpoints of the curability and the productivity. Examples of other addition reaction-cure-type silicone elastomer composition include a composition comprising organopolysiloxane containing an aliphatic unsaturated group such as vinyl group and organopolysiloxane containing mercaptoalkyl group, which is cured through ultraviolet irradiation or electron ray irradiation.

In the condensation reaction-cure-type silocone elastomer composition, an elastomer is formed by bonding two kinds of functional groups in organosiloxane to each other, or by bonding a functional group in organosiloxane with a functional group in a silicone compound such as silica and silane, to thereby form a cross-link through the condensation reaction. Examples of the condensation reaction-cure-type silicone elastomer composition include dehydrogenation condensation type, dehydration condensation type, deacecylation condensation type, deoxime condensation type, dealcoholization condensation type, deamidation condensation type, dehydroxylamination condensation type, and deacetone condensation type.

Typical examples of the dehydrogenation condensation reaction cure-type silicone elastomer composition include a composition comprising diorganopolysiloxane having silanol groups at the both molecular chain terminals, organohydrogenpolysiloxane and a condensation reaction catalyst such as a heavy-metal salt of an organic acid. The diorganopolysiloxane having silanol groups at the both molecular chain terminals is exemplified by dimethylpolysiloxane having silanol groups at the both molecular chain terminals, dimethylsiloxane/methylphenylsiloxane copolymer having silanol groups at the both molecular chain terminals, and methyl(3,3,3-trifluoropropyl)polysiloxane having silanol groups at the both molecular chain terminals. In the diorganopolysiloxane, the terminal silanol group may be partially converted to an alkoxy group in order to suppress the condensation reaction.

The organohydrogenpolysiloxane as a cross-linker is exemplified by dimethylsiloxane/methylhydrogensiloxane copolymer having dimethylhydrogensiloxy groups at the both molecular chain terminals, methylhydrogensiloxane having trimethylsiloxy groups at the both molecular chain terminals, and methylhydrogencyclosiloxane. Examples of the condensation reaction catalyst include dibutyltin dilaurate, dibutyltindiacetate, tin octanoate, dibutyltindioctoate, tin laurate, ferric stannooctanoate, lead octanoate, lead laurate, and zinc octanoate.

While the above dehydrogenation condensation reaction cure-type silicone elastomer composition is need to be cured by heating from the viewpoints of the curability and the productivity, the dehydration condensation type, the deacecylation type condensation, the deoxime type condensation, the dealcoholization type condensation, the deamidation type condensation, the dehydroxylamination type condensation, and the deacetone type condensation may form a elastomer by curing it at room temperature under humidity. Of the moisture-curable silicone elastomer compositions, a silicone-water based elastomer, which may form an elastomer by removing water, is particularly useful.

As the silicone-water based elastomer, generally used is an aqueous organopolysiloxane emulsion composition comprising (a) substantively linear polyorganosiloxane having at least two silanol groups in one molecule, (b) a cross-linker selected from the group consisting of a colloidal silica, an alkali metal silicate, a hydrolyzable silane and its partial hydrolyzed condensation, (c) a curing catalyst, (d) an emulsifier and (e) water.

The organopolysiloxane as the ingredient (a) forms a cross-link therebetween by the function of the (b) ingredient to be a rubber elastic body, which is a polymer having at least two silanol groups in one molecule. The position of the silanol groups is not specifically limited. However, the silanol groups are preferably positioned at the both molecular chain terminals. The organic group to bond to silicon atom other than the silicon atom contained in a silanol group is preferably a non-substituted or substituted monovalent hydrocarbon group, and is exemplified by an alkyl group such as methyl group, ethyl group, propyl group and butyl group, an alkenyl group such as vinyl group and allyl group, an aryl group such as phenyl group, an aralkyl group such as benzyl group, an alkaryl group such as styryl group and tolyl group, an cycloalkyl group such as cyclohexyl group and cyclopentyl group.

In those groups, part or all of the hydrogen atoms may be substituted with a halogen atom such as fluorine, chlorine or bromine. Such a group is exemplified by 3-chioropropyl group and 3,3,3-trifluoropropyl group. Of those, preferred is methyl group, vinyl group and phenyl group, and particularly preferred is methyl group. However, all of the groups are not necessarily the same to each other, and different kinds of the monovalent hydrocarbon groups may be combined with each other. Substantively, the linear means that it may be a linear comprising a branched chain in part thereof.

The molecular weight of the organopolysiloxane is not specifically limited, and is preferably 5000 or more. This is because reasonable tensile strength and stretch can be imparted by organopolysiloxane having a molecular weight of 3000 or more, but the most preferable tensile strength and stretch cannot be imparted unless the organopolysiloxane has a molecular weight of 500 or more. However, the molecular weight thereof is preferably 1000000 or less from the viewpoints of possibility of emulsifying emulsion.

Specific examples of the organopolysiloxane include dimethylpolysiloxane, methylphenylpolysiloxane, dimethylsiloxane/methylphenylsiloxane copolymer, methylvinylpolysiloxane, and dimethlsiloxane/methylvinylsiloxane copolymer which contain silanol groups at both molecular chain terminals. The organopolysiloxane may be synthesized according to a method comprising subjecting a cyclic or branched organopolysiloxane to hydrolytic condensation, or a method comprising hydrolyzing one or more kinds of diorganodihalogenosilane.

The cross-linker as the ingredient (b) functions as a cross-linking ingredient in the (a) ingredient, and is exemplified by colloidal silica, alkali metal silicate salt, and a hydrolyzable silane and its partial hydrolyzed condensation. The colloidal silica is exemplified by a fumy colloidal silica, a precipitated colloidal silica, and a colloidal silica having a diameter of 0.0001 to 0.1 μm which was stabilized by sodium ion, ammonium ion or aluminium ion. The content of the colloidal silica is preferably 1 to 150 parts by weight, more preferably 1 to 70 parts by weight, relative to 100 parts by weight of the organopolysiloxane as the ingredient (a).

The alkaline metal silicate salt is exemplified by lithium silicate, sodium silicate, potassium silicate and rubidium silicate. The content of the alkaline metal silicate is preferably 0.3 to 30 parts by weight, more preferably 0.3 to 20 parts by weight, relative to 100 parts by weight of the organopolysiloxane as the ingredient (a). The hydrolyzable silane for use herein is a silane having at least three hydrolysable groups bonding to the silicon atom in the molecular. This is because the silane having less than three hydrolysable groups does not give an elastomer.

Examples of the hydrolysable group include alkoxy groups such as methoxy group, ethoxy group, and butoxy group; acyloxy groups such as acetoxy group; substituted or non-substituted acetamide groups such as acetamide group, and N-methylacetamide group; alkenyloxy groups such as propenoxy group; substituted amino groups such as N,N-diethylamino group; and ketoxime groups such as methylethylketoxime group.

Specific examples thereof include methyltrimethoxysilane, vinyltrimethoxysilane, normal propylorthosilicate, ethylpolysilicate, propylpolysilicate, methyltir(propanoxy)silane, and methyltri(methylethylketooxime)silane. Two or more kinds of the silanes may be used in combination therewith. The content of the hydrolyzable silane and its partial hydrolyzed condensation is preferably 1 to 150 parts by weight, relative to 100 parts by weight of the organopolysiloxane as the ingredient (a).

The curing catalyst (c) is an ingredient that promotes the condensation reaction between the polyorganosilixoane as (a) ingredient and the cross-linker as (b) ingredient, and is exemplified by organic acids metal salts such as dibutyltin dilaurate, dibutyltin diacetate, tin octanoate, dibutyltin dioctoate, tin laurate, ferric stannooctanoate, lead octanoate, lead laurate, and zinc octanoate; titanate esters such as tetrabutyl titanate, tetrapropyl titanate and dibutoxytitaniumbis(ethyl acetoacetate); and amine compounds such as n-hexylamine, guanidine and hydrochloric acids thereof.

Preferably, those curing catalysts are preliminarily prepared to be in the form of emulsion by using an emulsifier and water according to a conventional method. The content of the curing catalyst is preferably 0.01 to 1.5 parts by weight, more preferably 0.05 to 1 parts by weight, relative to 100 parts by weight of the organopolysiloxane as the ingredient (a).

The emulsifier as the ingredient (d) is an ingredient for mainly emulsifying the organopolysiloxane as the ingredient (a), and is exemplified by anion series emulsifiers, nonionic series emulsifiers, and cation series emulsifiers. Examples of the anion series emulsifier include high fatty acid salts, high alcohol sulfonate, alkylbenzene sulfonate, alkylnaphtalene sulfonate, alkylphosphinates, and polyethyleneglycol sulfate salt.

Examples of the nonionic series emulsifier include polyoxyethylenealkylphenylethers, sorbitan fatty acid esters, polyoxyethylenesorbitan fatty acid esters, polyoxyalkylene fatty acid esters, polyoxyethylenepolyoxypropylenes, and monoglyceride-fatty acids.

Examples of the cation series emulsifier include aliphatic amine salts, quaternary ammonium salts, and alkylpyridinium salts. The emulsifier may be used singly or in combination thereof. The content of the emulsifier is preferably 2 to 30 parts by weight, relative to 100 parts by weight of the organopolysiloxane as the ingredient (a).

The content of the ingredient (e) is not specifically limited as long as the amount may be enough for preparing the aqueous emulsion by emulsifying the organopolysiloxane as the ingredient (a), the cross-linker as the ingredient (b), and the curing catalyst as the ingredient (c) through the function of the emulsifier as the ingredient (d).

The emulsion of the silicone water based elastomer may be prepared by uniformly mixing the above (a) to (e) ingredients. It is exemplified by a method comprising subjecting dimethylpolysiloxane having silanol groups at the both molecular chain terminals to emulsification into water in the presence of an emulsifier using an emulsification equipment such as homo mixer, homogenizer, and colloidal mill, and then, adding a cross-linker such as a colloidal silica, or a curing catalyst, or a method comprising subjecting the mixture to emulsification into water by using a cyclic diorganopolysiloxane such as octamethyltetrasiloxane, and then, adding a ring-opening polymerization catalyst and polymerizing it under heating to prepare an emulsion of dimethylpolysiloxane having silanol groups at the both molecular chain terminals, adding a cross-linker such as a colloidal silica, or a curing catalyst, and mixing the resulting emulsion.

Further, an emulsion which is extremely excellent in preservation stability may be obtained by preparing a base emulsion consisting of the ingredients (a) to (e), and then, preparing its pH to 9 to 12. The pH regulator for use herein is exemplified by amines such as dimethylamine and ethylenediamine, and hydroxides of alkaline metal such as sodium hydroxide and potassium hydroxide. Of those, preferred is an organic amine. The organic amine other than the above mentioned organic amines is exemplified by monoethanolamine, triethanolamine, morpholine and 2-amino-2-metyl-1-propanol. After thus the pH was adjusted, it is preferably ripened at given temperature for given period of time.

The ripening temperature is preferably the temperature at which the emulsion is not broken down, that is, in the range of 10 to 60° C., particularly preferably in the range of 15 to 50° C. The ripening period of time is suitably defined depending on the ripening temperature, and is, for example, one week or more at the temperature condition of 25° C., preferably 4 days or more at the temperature condition of 40° C.

Thus-obtained organopolysiloxane emulsion is excellent in preservation stability at room temperature, and can be readily cured by removing moisture, and thereby, be in the form of elastomer. When it does not need to have preservation stability at room temperature, the base emulsion may have a pH of less than 9. To the organopolysiloxan emulsion, another ingredient which is exemplified by fillers, gums, pigments, dyes, heat resistance agents, antiseptics, and co-penetrants such as ammonia water, may be suitably added and mixed.

In the case where the colloidal silica is not used as the cross-linker as the ingredient (b), the organopolysiloxane emulsion becomes poor in viscid, and therefore, a thick elastomer is hardly obtained. Thus, the filler such as fine powder quartz, calcium carbonate, magnesium carbonate, zinc dioxide, titanium dioxide powder, carbon black or the like is preferably added.

Further, those filler is preferably in the colloidal form since the colloidal filler forms an elastomer having larger tensile strength and larger stretch by removing moisture. The gum for use herein may be carboxymethyl cellulose, methyl cellulose, hydroxyethyl cellulose, polyvinyl alcohol, or polyacrylic acid.

In addition, examples of a moisture curable type silicone elastomer type composition include a deacetone type condensation type composition obtained by using diorganopolysiloxane having silanol groups at the both molecular chain terminals as mentioned above, which preferably has a viscosity of 1000 to 60000 cSt at 25° C., as a main ingredient, adding a cross-linker such as vinylacetoxysilane and a catalyst such as dibutyltin diacetate and dibutyltin dilaurate, further adding fillers for reinforcement such as aerosil, and uniformly kneading it; a deoxime type condensation type silicone elastomer composition obtained according to the same method as the deacetone type condensation type composition, except that the vinyltriacetoxysilane is replaced with vinyltrioximesilane; a dealcoholization type condensation composition obtained by according to the same method as the deacetone type condensation type composition, except that the vinyltriacetoxysilane is replaced with tetraethoxysilanc and the like. The invention is not limited to the above-mentioned cross-linking system as long as the cross-linker for use herein may be a cross-linker capable of converting the above diorganopolysiloxane having silanol groups at the both molecular chain terminals to an elastomer.

The radical reaction curable silicone elastomer composition is exemplified by a composition comprising an organopolysiloxane, a reinforcement filler and an organic peroxide. The composition may comprise an additional ingredient such as bulking filler, heat resistance agent, flame retardant, pigment, organic solvent and the like. The organopolysiloxane is exemplified by a gum-like polymer, wherein the both molecular chain terminals are end-blocked with trimethylsiloxy group, dimethylvinyl siloxy group, methylphenylvinyl siloxy group, or silanol group, and the main chain is dimethylpolysiloxane, dimethyl siloxane/methylphenyl siloxane copolymer, dimethyl siloxane/methylvinyl siloxane copolymer, dimethyl siloxane/methylphenyl siloxane/methylvinyl siloxane copolymer, or methyl(3,3,3-trifluoropropyl)/methylvinyl siloxane copolymer.

The reinforcement filler is exemplified by fumed silica. The organic peroxide is exemplified by benzoyl peroxide, dicumyl peroxide, di-t-butyl peroxide, 2,5-dimethyl-2,5-di(t-butyl peroxy)hexene, and 2,5-dimethyl-2,5-di(t-butyl peroxy)hexene. The radical reaction curable silicone elastomer composition is generally cured by heating it from the viewpoints of the curability and productivity.

In addition, examples of the radical reaction curable silicone elastomer composition include a composition which comprises an organopolysiloxane gum as the base compound, which may comprises bulking filler, heat resistance agent, flame retardant, pigment, or organic solvent as an additional ingredient, and which is cured through irradiation of β ray or γ ray; and a composition which comprises an organopolysioxane containing an alkenyl group bonding to an silicon atom therein, a sensitizer and a reinforcement filler, and which is cured through ultraviolet ray.

The silicone elastomer preferably has an average primary particle diameter of 0.1 to 100 μm, more preferably 2 to 15 μm. The commercial product thereof is exemplified by Torayfil E series manufactured by Dow Corning Toray Corporation, specifically by Torayfil E-500, E-505C, Torayfil E-506S, Torayfil E-507, Torayfil E-508, E-600, E-601, and E-606.

(X-2-4) Polyorganosiloxane Core Graft Copolymer

Polyorganosiloxane core graft copolymer is a composite gum series multilayer structure polymer obtained by polymerizing vinyl monomers consisting of polyfunctional monomers and other monomers capable of copolymerization in the presence of polyorganosiloxane particles to form a cross-linked structure as a core in which the polyorganosiloxane and the vinyl monomer series polymer ingredients are interwined with each other, and further polymerizing vinyl monomers to form shell.

The polyorganosiloxane particles may not only consist of polyorganosiloxane, but also be a modified polyorganosiloxane including other (co)polymer. The polyorganosiloxane particle may comprise polybutyl acrylate, butyl-acrylate styrene copolymer, or the like therein in an amount of 5% by weight or less, but preferably substantively consists of polyorganosiloxane from the viewpoint of the flame resistance.

The polyorganosiloxane particles preferably have a number average molecular weight according to electron microscope observation of 0.008 to 0.6 μm, more preferably 0.01 to 0.2 μm, further more preferably 0.01 to 0.15 μm. The polyorganosiloxane particles having a number average molecular weight of less than 0.008 μm is difficult to obtain. The polyorganosiloxane particles having a number average molecular weight of more than 0.6 μm tends to deteriorate the flame resistance of the resin composition comprising it.

In the polyorganosiloxane particles, the quantity of the polyorganosiloxane particles which do not dissolve in toluene (in the case of 0.5 g of the particles was soaked in 80 ml of toluene at room temperature for 24 hours) is preferably 95% or less, more preferably 50% or less, further more preferably 20% or less from the viewpoints of the flame resistance and impact resistance.

Specific examples of the polyorganosiloxane particles can be obtained by copolymerizing one or more kinds of siloxanes selected from dimethylsiloxane, methylphenylsiloxane, and diphenylsiloxane with a difunctional silane compound and a vinyl series polymerizable group-containing silane compound, or further with a polyfunctional silane compound in addition to the siloxanes, a difunctional silane compound and a vinyl series polymerizable group-containing silane compound.

The polyfunctional monomer which is one kind of the vinyl monomers has a compound having two or more of polymerizable unsaturated bonds in the molecular, and is exemplified by allyl methacrylate, triallyl cyanurate, isocyanuric acid triallyl, diallyl phthalate, ethylene glycol dimethacrylate, 1,3-butylene glycol dimethacrylate, and divinylbenzene. Those may used singly or in combination thereof. Of those, preferred is allyl methacrylate from the viewpoints of the economy and effect thereof.

The monomer capable of copolymerizing therewith as another vinyl monomer is exemplified by aromatic vinyl monomers such as styrene, α-methylstyrene, para-methylstyrene, and para-butylstyrene, vinyl cyanide series monomers such as acrylonitrile and methacrylonitrile, (meth)acrylic acid ester monomers such as methyl acrylate, ethyl acrylate, propyl acrylate, butyl acrylate, acrylic acid-2-ethylhexyl, glycidyl acrylate, hydroxyethyl acrylate, hydroxybutyl acrylate, methyl methacrylate, ethyl methacrylate, butyl methacrylate, lauryl methacrylate, glycidyl methacrylate, and hydroxyethyl methacrylate, carboxyl group-containing vinyl monomers such as itaconic acid, (meth)acrylic acid, fumaric acid, and maleic acid. Those may be used singly or in combination thereof. Preferred is a (meth)acrylic acid ester monomer from the viewpoints of the reactivity and stability.

When the graft copolymer is added into the thermoplastic polyester resin, then the vinyl monomer constructing the shell layer functions as an ingredient which ensures compatibility between the graft copolymer and the resin to uniformly disperse the graft copolymer into the resin. For this, the vinyl monomer constructing the shell layer which is mainly used is preferably the above mentioned (meth)acryl acid ester monomer.

As the polyorganosiloxane core graft copolymer, preferred is a polymer manufactured according to sequent multiple-stage seeded polymerization method which comprises sequentially coating a polymer in a previous stage with a polymer in a later stage. The fundamental polymer structure is a multilayered structure polymer comprising an inner core and an outermost shell layer wherein the inner core comprises a structure in which the polyorganosiloxane gum ingredient having lower glass transition temperature as a cross-linking ingredient and the polyalkyl(meth)acrylate gum ingredient interwine with each other, and the outermost shell layer comprises alkyl(meth)acrylate polymer which improves the adhesiveness to the matrix ingredient of the resin composition. Further, it may be a polymer comprising a three layers-structure which comprises the most inner core of a polymer comprising aromatic vinyl monomers, the interlayer of a polymer in which polyorganosiloxane gum ingredient and polyalkyl (meth)acrylate gum ingredient interwine with each other, and the outermost shell layer of alkyl(meth)acrylate polymer.

In the alkyl(meth)acrylate, the alkyl group has about 1 to 8 carbon atoms, and is exemplified by ethyl, butyl, and 2-ethylhexyl. The alkyl(meth)acrylate polymer may be cross-linked with an cross-linker such as ethylenic unsaturated monomers. The cross-linker is exemplified by alkylenediols, (meth)acrylate, polyester di(meth)acrylate, divinylbenzene, trivinylbenzene, triallyl cyanurate, and allyl(meth)acrylate.

The polyorganosiloxane core graft copolymer is preferably obtained by polymerizing 0.5 to 10 parts by weight, preferably 1 to 5 parts by weight, more preferably 2 to 4 parts by weight, of the vinyl monomer for the core layer and 5 to 50 parts by weight, preferably 10 to 39 parts by weight, more preferably 15 to 38 parts by weight, of the vinyl monomer for the shell layer in the presence of 40 to 90 parts by weight, preferably 60 to 80 parts by weight, more preferably 60 to 75 parts by weight, of the organosiloxane in the total amount of 100 parts by weight.

When the content of the polyorganosiloxane particles is too large or too small, then the resin composition thus-obtained by using this tends to be poor in the flame resistance thereof. When the content of the vinyl monomer for the core is too small, then the resin composition thus-obtained from this tends not to be effective for improving the flame resistance and the toughness. When the content of the vinyl monomers for the shell is too small or too large, then the resin composition thus-obtained by using this tends to be poor in the flame resistance thereof. Such a polyorganosiloxane core graft copolymer may be a commercial product which is exemplified by METABLEN S-2001, S-2200 and SRK-200 which are manufactured by Mitsubishi Rayon Co., Ltd.

The organosiloxane polymer (X-2) in the form of solid at 25° C. is added in an amount of 0.01 to 5 parts by weight, relative to 100 parts by weight of the thermoplastic polyester resin (A). When the content thereof is less than 0.01 parts by weight, then the toughness is not effectively improved. When the content thereof is more than 5 parts by weight, then the flame resistance is adversely influenced. The content thereof is preferably 0.1 to 4.5 parts by weight, particularly 0.5 to 4 parts by weight. The content of the organosiloxane-supported inorganic polymer is preferably 4 parts by weight or less.

(Y) Fibrous Reinforcement

The fibrous reinforcement (reinforcement filler) is the same as the fibrous reinforcement in the above resin composition (1). Preferably used is fabric filler such as glass fiber, carbon fiber, basalt fiber, wollastonite, and potassium titanate fiber. Of those, preferably usable is glass fiber from the viewpoints of the mechanical strength, the toughness and the heat resistance. Also may be usable granular or amorphous fillers such as calcium carbonate, titanium oxide, feldspar mineral, clay, organificated clay, carbon black, and glass bead, plate-like fillers such as talc, and squamous fillers such as glass flake, mica, and graphite.

In the resin composition (2), the content of the fibrous reinforcement (Y) is 0 to 150 parts by weight, preferably 5 to 120 parts by weight, relative to 100 parts by weight of the thermoplastic polyester resin (A). When the amount is less than 5 parts by weight, then the reinforcement is not effectively imparted. When the amount is more than 150 parts by weight, then the resin composition reduces in the flowability and the mechanical characteristics, particularly the toughness.

To the resin composition of the invention, a fluorine resin which is used for a dripping inhibitor may be added. Such a fluorine resin is preferably fluorinated polyolefin such as polytetrafluoroethylene, tetrafluoroethylene/perfluoro alkyl vinyl ether copolymer, tetrafluoroethylene/hexafluoropropylene copolymer, tetrafluoroethylene/ethylene copolymer, vinylidene fluoride, and polychlorotrifluoroethylene. Of those, preferred are polytetrafluoroethylene, tetrafluoroethylene/perfluoro alkyl vinyl ether copolymer, tetrafluoroethylene/hexafluoropropylene copolymer, and tetrafluoroethylene/ethylene copolymer, and more preferred are polytetrafluoroethylene, and tetrafluoroethylene hexafluoropropylene copolymer.

The fluorine resin is suitably selected from fluorine resins having suitable degree of polymerization (viscosity) in accordance with desired workability, dispersibility and other property in the resin composition. In general, the fluorine resin has a melt viscosity at 350° C. of $1.0 \times 10^2$ to $1.0 \times 10^{15}$ (Pa·s).

Of those, the melt viscosity is preferably $1.0 \times 10^3$ to $1.0 \times 10^{14}$ (Pa·s), particularly preferably $1.0 \times 10^{10}$ to $1.0 \times 10^{12}$ (Pa·s). The melt viscosity having less than $1.0 \times 10^2$ (Pa·s) is unfavorable because the dropping inhibiting ability at burning is insufficient. The melt viscosity having more than $1.0 \times 10^{15}$ (Pa·s) is unfavorable because the flowability of the resin composition extremely reduces.

The particle diameter of the fluorine resin for use herein may be in the broad rage which is from 0.05 μm to several mm. The shape of the fluorine resin for use herein may be suitably selected from powder or grain form to fibrous form. The shape or particle diameter can be suitably selected in accordance with the workability, the desired properties and effects of the resin composition through experiments.

The content of the dripping inhibitor is preferably 0.05 to 5 parts by weight, more preferably 0.1 to 3 parts by weight, relative to 100 parts of a total of all ingredients for (A) to (Y). When the fluorine resin ingredient is too small, then it interplays with other ingredient to make the flame resistance insufficient. In particular, improvement of the dripping property according to the burning test in UL-94 is insufficient. When the fluorine resin ingredient is too large, then it is unfavorable because dispersion failure decreases various properties.

To the resin composition of the invention, various aids which are conventionally added to thermoplastic resin may be added without diverting the object of the invention. Examples thereof include crystallization promoters, antioxidants, ultraviolet absorbers, stabilizers such as light stabilizer, antistats, lubricants, mold release agent, colorants such as dye and pigment, plasticizers, and hydrolysis resistance improvers (epoxy compound, carbodiimide compound, and the like). In particular, addition of the antioxidants for improving the heat resistance and addition of the mold release agent are more effective.

In the flame-retardant polyester resin composition, other thermoplastic resin is subsidiarily combined therewith. The thermoplastic resin may be usable any resin stable under high temperature, and is exemplified by polycarbonate, polyamide, polyphenyleneoxide, polystyrene series resin, polyphenylene sulfide ethylene, polysulfone, polyethersulfone, polyetherimide, polyether ketone, and fluororesin.

The thermoplastic polyester resin composition of the invention may be readily prepared with apparatus and methods which are conventionally employed in preparation of conventional resin compositions. Example of the methods include 1) a method comprising mixing individual ingredients, then kneading the resulting mixture by a single-screw kneader or a double-screw kneader and extruding the resulting mixture to form pellets; 2) a method comprising mixing individual ingredients other than fibrous reinforcement, side-feeding the fibrous reinforcement from a side-feeder from the extruder, melt-kneading the resulting material to form pellets; 3) a method comprising preparing two or more kinds of pellets which are different in composition to each other and which each are composed of raw materials composing the resin composition, then mixing the pellets so as to have a desired ratio to prepare a resin composition having a desired composition. A method comprising reducing parts of the thermoplastic resin into power, and then mixing the resulting powder with the other ingredients, feeding the resulting material into an extruder is a preferable method for uniformly mixing those ingredients.

EXAMPLES

The invention is described in more detail with reference to the following Examples. However, the invention should not be limited to these Examples as far as it exceeds the gist of the invention. Evaluations for the resin composition were carried out according to the following methods.

Example 1

Flexural Strength

A burning test specimen having a thickness of 1.6 mm for UL94 (Subject 94, Under-writer's Laboratory) was formed by injection molding, and is subjected to the flexural strength test in the condition that the distance between spans was 40 mm and the testing speed was 2 mm/min.
Weld Flexural Strength
To the same metal as that used for the above flexural strength testing, the resin was injected from two gates of the both sides in the longitudinal direction of a test specimen to be formed to form a burning test specimen having a thickness of 1.6 mm for UL94 and having weld line formed on the center thereof. Using the obtained specimen, the weld flexural strength test was carried out in the same condition as that in the above flexural strength test. The weld retention was calculated according to the following formula:

(flexural strength of specimen having weld/flexural strength of specimen not having weld)×100%.

Flame Resistance Test:
The flame resistance test was carried out according to the method of UL94. Five specimens having a thickness of 0.8 mm are subjected to the flame resistance test and are classified into V-0, V-1, V-2, and HB according to the evaluation method disclosed in UL94. V-0 means that the specimen has the greatest level of the flame resistance. Total burning time means sum of the total burning time of the five specimens, which includes sum of burning time in the first flame contact and the second flame contact.
Comparative Tracking Index Test (Abbreviated Expression: CTI Test):
Concerning a test specimen (having a thickness of 3 mm), CTI was determined according to the testing method defined in International standard, IEC60112. CTI shows resistance to tracking at 25 V intervals from 100 V to 600 V when solid electric insulating material was polluted while electric field is added to a surface of the solid electric insulating material.

When the numerical value is high, the tracking index is good, and is preferably 500 V or more.
Mold Deposit:
Using the injection-molder SE 50 manufactured by Sumitomo Heavy Industries, Ltd., a resin molded article having a length of 35 mm, a wide of 14 mm and a thickness of 2 mm was produced using a pin gate metal in the condition that the injection pressure was 50 MPa, the injection speed was 80 mm/sec, the cylinder temperature was 260° C., the injection period was 3 sec, the cooling was 8 sec, the metal temperature was 80° C., and the suck back was 3 mm.
According to the condition, 1000 shots of the successive injection-molding were carried out, and then, mold deposit which adhered to the mold (metal pollution) was visually observed and evaluated according to the following standard.
⊚; mold deposit was hardly observed.
○; mold deposit was slightly observed.
Δ; mold deposit was clearly observed.
x; mold deposit thickly adhered to the whole of the metal.
Mold Release Performance:
Using the injection-molder manufactured by Fanuc Corporation (α-100iA), a molded article having a shallow cup-like shape having a thickness of 3 mm, an external diameter of 100 mm, and a deep of 20 mm was successively produced by successive injection-molding in the condition that the resin temperature was 270° C., the mold temperature was 80° C., and the cycle was 25 second. The molded article was visually observed on whether it has a trace of the ejection pin or not, to thereby determine the mold release performance thereof. When the trace of the pin was clearly observed, it was evaluated x. When the trace of the pin was slightly observed, it was evaluated ○. When the trace of the pin was not observed, it was evaluated ⊚.
The materials for use in the Examples are described below.
(A) Thermoplastic Polyester Resin:
(A-1) PBT: 5020 manufactured by Mitsubishi Engineering-Plastics Corporation, NOVADURAN (trade mark) 5020, polybutylene terephthalate resin having an inherent viscosity of 1.20 dl/g.
(A-2) PBT: 5008 manufactured by Mitsubishi Engineering-Plastics Corporation, NOVADURAN (trade mark) 5008, polybutylene terephthalate resin having an inherent viscosity of 0.85 dl/g.
(B) Phosphinate:
(B-1) aluminium diethyl phosphinate: manufactured by Clariant, OP1240 (product name)
(X-1) Organosiloxane Compound:
(X-1-1) Silicone compound-1: manufactured by Dow Corning Toray Corporation, 217Flake (product name), the weight-average molecular weight avelage (Mw): 2000, the content of hydroxyl groups: 7% by weight, the content of phenyl group: 100 mol %, the average molecular formula: $(PhSiO_{3/2})_{1.0}(HO_{1/2})_{0.57}$.
(X-1-2) Silicone compound-2: manufactured by Dow Corning Toray Corporation, TMS217 (product name), Mw: 2000, the content of hydroxyl groups: 2% by weight, the content of phenyl group: 100 mol %, silicone resin obtained by subjecting the silicone compound (X-1-1) to the end-block treatment with trimethylsilyl groups.
(X-1-3) Silicone compound-3: manufactured by Konishi Chemical Ind. Co., Ltd., SR-21 (product name), Mw: 3800, the content of hydroxyl groups: 6% by weight, the content of phenyl group: 100 mol %, the average molecular formula: $(PhSiO_{3/2})_{1.0}(HO_{1/2})_{0.48}$.
(X-1-4) Silicone compound-4: manufactured by Konishi Chemical Ind. Co., Ltd., SR-20 (product name), Mw: 6700, the content of hydroxyl groups: 3% by weight, the content of phenyl group: 100 mol %, the average molecular formula: $(PhSiO_{3/2})_{1.0}(HO_{1/2})_{0.24}$.

(X-1-5) Silicone compound-5: manufactured by Dow Corning Toray Corporation, SH6018 (product name), Mw: 2000, the content of hydroxyl groups: 6% by weight, the content of phenyl group: 70 mol %, the content of propyl group is 30 mole %, the average molecular formula: $(PhSiO_{3/2})_{0.7}(ProSiO_{3/2})_{0.3}(HO_{1/2})_{0.48}$.

(X-1-6) Silicone compound-6: manufactured by Shin-Etsu Chemical Co., Ltd., X40-9805 (product name), methylphenyl series organosiloxane, the content of phenyl group: 50 mol %.

(X-1-7) Silicone compound-7: manufactured by Dow Corning Toray Corporation, 26800 (product name), triphenylsilanol, the content of phenyl group: 100 mol %, the average molecular formula: $Ph_3SiOH$.

(X-1-8) Silicone compound-8: manufactured by Shin-Etsu Chemical Co., Ltd., octaphenyltetracyclosiloxane, the content of phenyl group: 100 mol %.

(X-1-9) Silicone compound-9: manufactured by Shin-Etsu Chemical Co., Ltd., KR-511 (product name), methylphenyl series organosiloxane oligomer, the content of phenyl group: 50 mol %.

(X-1-10) Silicone compound-10: manufactured by Momentive Performance Materials Inc., TSR165 (product name), polymethylphenylmethoxysiloxane, the content of phenyl group: 50 mol %.

(X-1-11) Silicone compound-11: manufactured by Dow Corning Toray Corporation, SH200 (product name), polydimethylsiloxane, the content of hydroxyl groups: 0% by weight, the content of phenyl group: 0 mol %, the viscosity: 60000 cPt.

(Y-1) Glass fiber: manufactured by Owens Corning Corporation, 03JA-FT592 (product name), the diameter: 10.5 μm (E-1-1) Zinc borate: manufactured by BORAX, Firebrake500 (product name), $B_2O_3$ 56.2 wt %, ZnO 43.8 wt %, the diameter: 10 μm (F) Other Additives (F-1) Melamine cyanurate: manufactured by Synthetic Chemical Industry Co., Ltd., MX44 (product name)

(F-2) Fluorine series resin: manufactured by Sumitomo 3M TF1750 (product name)

(F-3) Antioxidant: manufactured by Chiba speciality chemical Co., Ltd, phenol series antioxidant, Irganox 1010 (product name).

(F-4) Phosphorous stability: manufactured by Adeka Corporation, Adekastab PEP36 (product name).

(F-5) Mold release agent: manufactured by Nippon Seiro Co., Ltd., paraffine wax, FT100 (product name).

Example 1-1 to 1-6 and Comparative Example 1-1 to 1-9

All the ingredients except for the glass fiber were mixed at the ratio by weight as shown in Table 1 or 2 in the super mixer (manufactured by SHINEI-KIKAI Co., Ltd., SK-350 type), and putting the resulting mixture into the hopper of the double-screw kneader having L/D=42 (manufactured by The Japan Steel Works, Ltd., TEX30HSST), side-feeding the glass fiber to the mixture, and extruding the resulting mixture at the discharge rate of 20 kg/h, the screw revolutions of 250 rpm, and the barrel temperature of 260° C., to thereby obtain pellets of the polybutylene terephthalate resin.

Using the injection-molder (manufactured by Sumitomo Heavy Industries, Ltd., type: SE50), a burning test specimen having a thickness of 1.6 mm according to UL94, a burning test specimen having weld line (which is used for flexural strength test), a specimen having a thickness of 0.8 mm for UL94, and a Lest specimen for the comparative tracking index test (the length and the wide each are 10 cm and the thickness is 3 mm) were produced form the pellets of the resin composition at the resin temperature of 260° C. and the metal temperature of 80° C. At the same time, the mold deposit thereof and the mold release performance thereof were evaluated in the production condition. The results are shown in Table 1 or 2.

TABLE 1

| | | Example | | | | | | | | | | | | | | | |
|---|---|---|---|---|---|---|---|---|---|---|---|---|---|---|---|---|---|
| | | 1-1 | 1-2 | 1-3 | 1-4 | 1-5 | 1-6 | 1-7 | 1-8 | 1-9 | 1-10 | 1-11 | 1-12 | 1-13 | 1-14 | 1-15 | 1-16 |
| A-1 | PBT | 100 | 100 | 100 | 100 | 100 | 100 | 100 | 100 | 100 | 100 | 100 | 100 | | | | |
| A-2 | PBT | | | | | | | | | | | | | | | | |
| B-1 | Phosphinate | 33.4 | 29.9 | 30.4 | 29.9 | 29.9 | 29.9 | 29.9 | 29.9 | 29.9 | 29.9 | 29.9 | 29.9 | 27.3 | 27.9 | 34.1 | 34.8 |
| X-1-1 | Silicone compound 1 | 1.5 | 3.0 | 3.0 | | | | | | | | | | 6.4 | 6.6 | 4.0 | 4.1 |
| X-1-2 | Silicone compound 2 | | | | 3.0 | | | | | | | | | | | | |
| X-1-3 | Silicone compound 3 | | | | | 3.0 | | | | | | | | | | | |
| X-1-4 | Silicone compound 4 | | | | | | 3.0 | | | | | | | | | | |
| X-1-5 | Silicone compound 5 | | | | | | | 3.0 | | | | | | | | | |
| X-1-6 | Silicone compound 6 | | | | | | | | 3.0 | | | | | | | | |
| X-1-7 | Silicone compound 7 | | | | | | | | | 3.0 | | | | | | | |
| X-1-8 | Silicone compound 8 | | | | | | | | | | 3.0 | | | | | | |
| X-1-9 | Silicone compound 9 | | | | | | | | | | | 3.0 | | | | | |
| X-1-10 | Silicone compound 10 | | | | | | | | | | | | 3.0 | | | | |
| X-1-11 | Silicone compound 11 | | | | | | | | | | | | | | | | |
| Y-1 | Glass fiber | 15.2 | 15.0 | 15.2 | 15.0 | 15.0 | 15.0 | 15.0 | 15.0 | 15.0 | 15.0 | 15.0 | 15.0 | 23.9 | 24.6 | 60.1 | 61.4 |
| E-1-1 | Zinc borate | | | 1.5 | | | | | | | | | | | 3.3 | | 2.0 |
| F-2 | Fluorine resin | 0.8 | 0.8 | 0.8 | 0.8 | 0.8 | 0.8 | 0.8 | 0.8 | 0.8 | 0.8 | 0.8 | 0.8 | 0.8 | 0.8 | 1.0 | 1.0 |
| F-3 | Antioxidant | 0.3 | 0.3 | 0.3 | 0.3 | 0.3 | 0.3 | 0.3 | 0.3 | 0.3 | 0.3 | 0.3 | 0.3 | 0.3 | 0.3 | 0.4 | 0.4 |
| F-4 | Phosphorous stability | 0.3 | 0.3 | 0.3 | 0.3 | 0.3 | 0.3 | 0.3 | 0.3 | 0.3 | 0.3 | 0.3 | 0.3 | 0.3 | 0.3 | 0.4 | 0.4 |
| F-5 | Mold release agent | 0.3 | 0.3 | 0.3 | 0.3 | 0.3 | 0.3 | 0.3 | 0.3 | 0.3 | 0.3 | 0.3 | 0.3 | 0.3 | 0.3 | 0.4 | 0.4 |
| Flexural strength (MPa) | | 117 | 120 | 115 | 125 | 121 | 122 | 128 | 124 | 120 | 119 | 122 | 125 | 140 | 130 | 170 | 161 |
| Weld flexural strength (MPa) | | 59 | 62 | 59 | 65 | 63 | 62 | 66 | 68 | 59 | 59 | 60 | 63 | 65 | 59 | 66 | 60 |
| Weld retention (%) | | 50.4 | 51.7 | 51.3 | 52.0 | 52.1 | 50.8 | 51.6 | 54.8 | 49.2 | 49.6 | 49.2 | 50.4 | 46.4 | 45.3 | 38.8 | 37.2 |
| Flame | 0.8 mmt | V-0 | V-0 | V-0 | V-0 | V-0 | V-0 | V-0 | V-0 | V-0 | V-0 | V-0 | V-0 | V-0 | V-0 | V-0 | V-0 |

TABLE 1-continued

|  |  | Example | | | | | | | | | | | | | | | |
|---|---|---|---|---|---|---|---|---|---|---|---|---|---|---|---|---|---|
|  |  | 1-1 | 1-2 | 1-3 | 1-4 | 1-5 | 1-6 | 1-7 | 1-8 | 1-9 | 1-10 | 1-11 | 1-12 | 1-13 | 1-14 | 1-15 | 1-16 |
| resistance | Total burning time (s) | 34 | 28 | 19 | 25 | 25 | 26 | 33 | 34 | 21 | 22 | 27 | 33 | 35 | 25 | 35 | 24 |
| CTI(V) | | 550 | 525 | 575 | 525 | 525 | 525 | 550 | 550 | 525 | 525 | 525 | 550 | 525 | 600 | 550 | 600 |
| Mold deposite | | ◎ | ◎ | ◎ | ◎ | ◎ | ◎ | ◎ | ◎ | ○ | ○ | ○ | ○ | ◎ | ◎ | ◎ | ◎ |
| Mold release performance | | ◎ | ◎ | ◎ | ◎ | ◎ | ◎ | ◎ | ◎ | ◎ | ◎ | ◎ | ◎ | ◎ | ◎ | ◎ | ◎ |

TABLE 2

|  |  | Comparative Example | | | | | | | | |
|---|---|---|---|---|---|---|---|---|---|---|
|  |  | 1-1 | 1-2 | 1-3 | 1-4 | 1-5 | 1-6 | 1-7 | 1-8 | 1-9 |
| A-1 | PBT | 100 | 100 | | | 100 | | | | |
| A-2 | PBT | | | 100 | 100 | | 100 | 100 | 100 | 100 |
| B-1 | Phosphinate | 29.0 | 27.5 | 31.0 | 34.2 | 29.9 | 25.5 | 37.9 | 32.8 | 33.4 |
| X-1-1 | Silicone compound 1 | | | | | | 0.5 | 15.6 | | |
| X-1-11 | Silicone compound 11 | | | | | 3.0 | | | | |
| Y-1 | Glass fiber | 14.5 | 16.2 | 27.3 | 68.3 | 15.0 | 22.5 | 66.8 | 57.8 | 58.9 |
| E-1-1 | Zinc borate | | | | | | | | | 2.0 |
| F-1 | Melamine cyanurate | | 16.2 | 21.9 | 22.8 | | | | | |
| F-2 | Fluorine resin | 0.7 | 0.8 | 0.9 | 1.1 | 0.8 | 0.8 | 1.1 | 1.0 | 1.0 |
| F-3 | Antioxidant | 0.3 | 0.3 | 0.4 | 0.5 | 0.3 | 0.3 | 0.5 | 0.4 | 0.4 |
| F-4 | Phosphorous stability | 0.3 | 0.3 | 0.4 | 0.5 | 0.3 | 0.3 | 0.5 | 0.4 | 0.4 |
| F-5 | Mold release agent | 0.3 | 0.3 | 0.4 | 0.5 | 0.3 | 0.3 | 0.5 | 0.4 | 0.4 |
| Flexural strength (MPa) | | 129 | 124 | 135 | 150 | 126 | 137 | 148 | 144 | 145 |
| Weld flexural strength (MPa) | | 62 | 49 | 53 | 43 | 60 | 66 | 50 | 68 | 52 |
| Weld retention (%) | | 48.1 | 39.5 | 39.2 | 28.7 | 47.6 | 48.1 | 33.7 | 47.2 | 35.9 |
| Flame | 0.8 mmt | V-1 | V-0 | V-0 | V-0 | V-1 | V-1 | V-1 | V-1 | V-1 |
| resistance | Total burning time (s) | 54 | 30 | 31 | 32 | 50 | 60 | 78 | 59 | 60 |
| CTI(V) | | 550 | 600 | 600 | 600 | 600 | 550 | 450 | 600 | 600 |
| Mold deposite | | ◎ | X | X | X | ○ | ◎ | ○ | ○ | ○ |
| Mold release performance | | ○ | ○ | ○ | ○ | ○ | ○ | ○ | ○ | ○ |

The following is clear from Tables 1 and 2. That is, the resin compositions of Comparative Examples are poor in at least one of the flame resistance, the weld retention, the CTI, the mold deposit and the mold release performance, and therefore, balance between the performances is bad. On the other hand, the thermoplastic polyester resin compositions of the invention are excellent in all the performances.

The resin molded articles obtained by producing the thermoplastic polyester resin composition of the invention are excellent in the flame resistance, the weld strength retention, the CTI and the mold release performance. Also a little mold deposit occurs, and therefore, the productivity is excellent. Therefore, in particular, the resin composition of the invention is favorably applied to electric or electronic components such as connectors, terminals and other various components. In addition, the resin composition is favorably applied to automobile components and architectural components.

Example 2

Tensile Strength and Tensile Elongation

According to ISO527-1, 2, the tensile strength and tensile elongation were measured. When the tensile elongation is larger, toughness is higher.
Weld Tensile Strength:
To a mold having the same size as the metal for the above ISO tensile testing, the resin was injected from two gates of the both sides in the longitudinal direction of a test specimen to be formed to form a burning test specimen having weld line formed on the center thereof. Using the test specimen, the evaluation was carried out. The weld performance was determined according to the weld retention, and was evaluated as the weld performance (weld adhesiveness) is superior when the value is high. The weld retention is shown as (tensile strength of a test specimen having weld line/tensile strength of a test specimen not having weld line)×100%.
Burning Test:
It was carried out as the same method in Example 1.
Comparative Tracking Index Test (Abbreviated Expression: CTI Test):
It was carried out as the same method in Example 1.
Specific Wear Rate (mm$^3$/kgf·km):
To thrust friction/wear testing machine (manufactured by Orientec Co., Ltd.), two cylindrical test specimens which are the same kind to each other were fixed to upper side and lower side so that they pair up. Pressure on the contact area of the two test specimens (surface pressure) was set to be 5 Kgf and the test specimen in the lower side was turned over at a linear speed of 10 cm/sec while the test specimen in the upper side was fixed. After turned up for 20 hours, total wear amount of the two cylindrical test specimens was measured. The unit of the specific wear rate was mm$^3$/kgf·km. When the specific wear rate is larger, the specific wear is racking and the wear performance is poorer.
Mold Release Performance:
Using the injection-molder manufactured by Fanuc Corporation (α-100iA), a molded article having a shallow cup-like shape having a thickness of 3 mm, an external diameter of 100 mm, and a deep of 20 mm was successively produced by successive injection-molding in the condition that the resin temperature was 275° C., the mold temperature was 70° C., and the cycle was 35 second for the composition not comprising glass fiber or in the condition that the resin temperature was 275° C., the mold temperature was 85° C., and the cycle was 25 second for the composition comprising glass fiber. The molded article was visually observed on whether it has a trace of the ejection pin or not to thereby determine the mold release performance thereof. When the trace of the pin was clearly observed, it was evaluated x. When the trace of the pin was slightly observed, it was evaluated ○. When the trace of the pin was not observed, it was evaluated ⊚.

The materials for use in the Examples are described below.

(A) Thermoplastic Polyester Resin:
(A-1) PBT: 5020 manufactured by Mitsubishi Engineering-Plastics Corporation, NOVADURAN (trade mark) 5020, polybutylene terephthalate resin having an inherent viscosity of 1.20 dl/g.
(A-2) PBT: 5008 manufactured by Mitsubishi Engineering-Plastics Corporation, NOVADURAN (trade mark) 5008, polybutylene terephthalate resin having an inherent viscosity of 0.85 dl/g.
(A-3) Polybutylene terephthalate resin manufactured by Mitsubishi Engineering-Plastics Corporation, NOVADURAN (trade mark) 5510 (polytetraethyleneglycol (PTMG)-copolymerized polybutylene terephthalate resin)
(B) Phosphinate:
(B-1) Aluminium diethyl phosphinate: manufactured by Clariant, OP1240 (product name)
(C) Salt of Amino Group-Containing Triazine
(C-1) Melamine polyphosphate: manufactured by Chiba speciality chemical Co., Ltd, melapure 200/70
(C-2) Cyanuric acid melamine: manufactured by Mitsubishi chemical corporation, MX44
(X-2) Polyorganosiloxane Copolymer
(X-2-1-1) manufactured by Dow Corning Toray Corporation, product name: DC4-7081 (silica-supported silicone powder; 60% by weight of polydimethylsiloxane having methacryl group was supported with 40% by weight of silica and was powdered; the content of hydroxyl groups: 0% by weight, and the content of phenyl group: 0 mol %; it is in the form of solid at 25° C.)
(X-2-1-2) manufactured by Dow Corning Toray Corporation, product name: DC4-7051 (60% by weight of polydimethylsiloxane having an epoxy group was supported with 40% by weight of silica and was powdered; it is in the form of solid at 25° C.)
(X-2-1-3) manufactured by Dow Corning Toray Corporation, product name: Torayfil F202 (60% by weight of liner polydimethylsiloxane having a viscosity of 60000 cSt was supported with 40% by weight of silica and was powdered; it is in the form of solid at 25° C.)
(X-2-2) manufactured by Dow Corning Toray Corporation, product name: 217Flake (phenyl silicone resin, flexibility point is 86° C.; it is in the form of solid at 25° C.)
(X-2-3) manufactured by Dow Corning Toray Corporation, product name: Torayfil E601 (silicone elastomer comprising an epoxy group; it is in the form of solid at 25° C.)
(X-2-4) manufactured by Mitsubishi Rayon Co., Ltd., product name: Metablen S2200 (polyorganosiloxane core graft copolymer; it is in the form of solid at 25° C.)
(X-2-5) manufactured by Dow Corning Toray Corporation, SH200 (product name), linear polydimethylsiloxane having a viscosity of 60000 cSt; it is not in the form of solid at 25° C.; Mw: $4 \times 10^4$, the content of hydroxyl groups: 0% by weight, the content of phenyl group: 0 mol %,)
(X-2-6) Acrylic core-shell compound: manufactured by Kureha Corporation, product name: Pararoido KM336P (not comprising polyorganosiloxane).
(X-2-7) glycidyl methacrylate-copolymerized polyethylene: manufactured by Sumitomo Chemical Corporation, product name: Bond first BF-7M (not comprising polyorganosiloxane).
(Y-2) Fibrous Reinforcement
Glass fiber: manufactured by Asahi fiber glass Co., Ltd, product name: chop strand 03JA-FT592
(F-2) Fluorine series resin: manufactured by Sumitomo 3M, product name: Dyneon TF1750
(F-3) Phenol series antioxidant: manufactured by Chiba speciality chemical Co., Ltd, Irganox 1010
(F-4) Phosphorous stability: manufactured by Adeka Corporation, Adekastab PEP36
(F-5) Mold release agent: manufactured by Nippon Seiro Co., Ltd., paraffine wax, FT100
(F-6) Lubricant: manufactured by NOF Corporation, Calcium stearate.

Examples 2-1 to 2-9 and Comparative Examples 2-1 to 2-9

All the ingredients except for the glass fiber were mixed at the ratio by weight as shown in Table 3 or 4 in the super mixer (manufactured by SHINEI-KIKAI Co., Ltd., SK-350 type), and putting the resulting mixture into the hopper of the double-screw kneader having L/D=42 (manufactured by The Japan Steel Works, Ltd., TEX30HSST), side-feeding the glass fiber to the mixture, and extruding the resulting mixture at the discharge rate of 20 kg/h, the screw revolutions of 150 rpm, and the barrel temperature of 260° C., to thereby obtain pellets of the polybutylene terephthalate resin.

Using the injection-molder (manufactured by Sumitomo Heavy Industries, Ltd., type: S-75 MIII), a ISO tensile test specimen (ISO3167), a specimen having a thickness of 0.8 mm for UL94, a test specimen for the comparative tracking index test (the length and the wide each are 10 cm and the thickness is 3 mm), and a cylindrical test specimen for friction/wear were produced from the pellets of the resin composition at 270° C. and the metal temperature of 80° C. In addition, the above mold release performance was evaluated. The results are shown in Table 3 or 4.

TABLE 3

| | | Example | | | | | | | | |
|---|---|---|---|---|---|---|---|---|---|---|
| | | 2-1 | 2-2 | 2-3 | 2-4 | 2-5 | 2-6 | 2-7 | 2-8 | 2-9 |
| (A) | (A-1) | 80.00 | 80.00 | 80.00 | 80.00 | 80.00 | 80.00 | | | |
| | (A-2) | | | | | | | 60.00 | 60.00 | 100.00 |
| | (A-3) | 20.00 | 20.00 | 20.00 | 20.00 | 20.00 | 20.00 | 40.00 | 40.00 | |
| (B) | | 22.53 | 22.53 | 22.53 | 22.53 | 22.53 | 22.53 | 31.48 | 31.48 | 31.56 |
| (C) | (C-1) | | | | | | | | 34.42 | |
| | (C-2) | | | | | | | 22.31 | | 23.04 |
| (D) | (X-2-1-1) | 1.25 | | | | | | 1.86 | 1.72 | 2.30 |
| | (X-2-1-2) | | 1.25 | | | | | | | |
| | (X-2-1-3) | | | 1.25 | | | | | | |
| | (X-2-2) | | | | 0.63 | | | | | |

TABLE 3-continued

| | | Example | | | | | | | | |
|---|---|---|---|---|---|---|---|---|---|---|
| | | 2-1 | 2-2 | 2-3 | 2-4 | 2-5 | 2-6 | 2-7 | 2-8 | 2-9 |
| | (X-2-3) | | | | | 1.25 | | | | |
| | (X-2-4) | | | | | | 0.63 | | | |
| | (X-2-5) | | | | | | | | | |
| | (X-2-6) | | | | | | | | | |
| | (X-2-7) | | | | | | | | | |
| (Y-2) | | | | | | | | 27.89 | 25.82 | 69.12 |
| (F-2) | | 0.63 | 0.63 | 0.63 | 0.63 | 0.63 | 0.63 | | | |
| (F-3) | | 0.25 | 0.25 | 0.25 | 0.25 | 0.25 | 0.25 | 0.37 | 0.34 | 0.46 |
| (F-4) | | 0.25 | 0.25 | 0.25 | 0.25 | 0.25 | 0.25 | 0.37 | 0.34 | 0.46 |
| (F-5) | | 0.25 | 0.25 | 0.25 | 0.25 | 0.25 | 0.25 | 0.37 | 0.34 | 0.46 |
| (F-6) | | 0.04 | 0.04 | 0.04 | 0.04 | 0.04 | 0.04 | | | |
| Flexural strength (Mpa) | | 34 | 34 | 33 | 30 | 33 | 33 | 70 | 73 | 92 |
| Tensile elongation (%) | | 43 | 42 | 39 | 15 | 30 | 22 | 3.5 | 3.5 | 2.8 |
| Weld flexural strength (%) | | 4.9 | 4.8 | 4.4 | 1.9 | 3.4 | 2.5 | 1.1 | 1.1 | 1.1 |
| Weld retention (%) | | 10.2 | 10.3 | 10.1 | 11.2 | 10.2 | 10.2 | 23.9 | 23.9 | 28.2 |
| Flame resistance (thickness is 0.8 mm) | | V-0 | V-0 | V-0 | V-0 | V-0 | V-0 | V-0 | V-0 | V-0 |
| CTI(V) | | 600 | 600 | 600 | 600 | 600 | 600 | 600 | 600 | 600 |
| Specific wear rate (mm$^3$/kg · km) | | 0.08 | 0.07 | 0.09 | 0.1 | 0.13 | 0.3 | 0.11 | 0.11 | 0.12 |
| Mold release performance | | ◎ | ◎ | ◎ | ◎ | ◎ | ◎ | ◎ | ◎ | ◎ |

TABLE 4

| | | Comparative Example | | | | | | | | |
|---|---|---|---|---|---|---|---|---|---|---|
| | | 2-1 | 2-2 | 2-3 | 2-4 | 2-5 | 2-6 | 2-7 | 2-8 | 2-9 |
| (A) | (A-1) | 80.00 | 80.00 | 80.00 | 80.00 | 80.00 | | | | |
| | (A-2) | | | | | | 60.00 | 100.00 | 60.00 | 60.00 |
| | (A-3) | 20.00 | 20.00 | 20.00 | 20.00 | 20.00 | 40.00 | | 40.00 | 40.00 |
| (B) | | 22.22 | 22.53 | 22.53 | 22.53 | 22.53 | 31.48 | 33.78 | | |
| (C) | (C-1) | | | | | | | | | |
| | (C-2) | | | | | | 22.54 | 22.52 | | |
| (D) | (X-2-1-1) | | | | | 8.26 | | | | 1.16 |
| | (X-2-1-2) | | | | | | | | | |
| | (X-2-1-3) | | | | | | | | | |
| | (X-2-2) | | | | | | | | | |
| | (X-2-3) | | | | | | | | | |
| | (X-2-4) | | | | | | | | | |
| | (X-2-5) | | 1.25 | | | | | | | |
| | (X-2-6) | | | 1.25 | | | | | | |
| | (X-2-7) | | | | 1.25 | | | | | |
| (Y-2) | | | | | | | 28.17 | 67.57 | 17.54 | 17.37 |
| (F-2) | | 0.62 | 0.63 | 0.63 | 0.63 | 0.59 | | | | |
| (F-3) | | 0.25 | 0.25 | 0.25 | 0.25 | 0.24 | 0.38 | 0.45 | 0.23 | 0.23 |
| (F-4) | | 0.25 | 0.25 | 0.25 | 0.25 | 0.24 | 0.38 | 0.45 | 0.23 | 0.23 |
| (F-5) | | 0.25 | 0.25 | 0.25 | 0.25 | 0.24 | 0.38 | 0.45 | 0.23 | 0.23 |
| (F-6) | | 0.04 | 0.04 | 0.04 | 0.04 | 0.04 | | | | |
| Flexural strength (Mpa) | | 33 | 33 | 33 | 33 | 30 | 70 | 90 | 75 | 75 |
| Tensile elongation (%) | | 11 | 11 | 23 | 28 | 48 | 2.5 | 1.9 | 4.1 | 4 |
| Weld flexural strength (%) | | 1.1 | 1.0 | 1.7 | 1.5 | 6.0 | 0.9 | 0.3 | 2.0 | 2.0 |
| Weld retention (%) | | 9.1 | 8.3 | 6.9 | 5.1 | 11.1 | 26.5 | 13.6 | 32.8 | 33.3 |
| Flame resistance (thickness is 0.8 mm) | | V-0 | V-2 | V-1 | V-1 | V-1 | V-0 | V-0 | HB | HB |
| CTI(V) | | 600 | 575 | 600 | 600 | 600 | 600 | 600 | 0 | 0 |
| Specific wear rate (mm$^3$/kg · km) | | 0.5 | 0.4 | 0.4 | 0.1 | 0.05 | 0.7 | 1.5 | 0.15 | 0.1 |
| Mold release performance | | X | ○ | ○ | ○ | ◎ | ○ | ○ | ◎ | ◎ |

The following is clear from Tables 3 and 4.
(1) Compared Comparative Examples 2-8 with Comparative Examples 2-9, the toughness and the flame resistance were not improved when silica-supported polyorganosiloxane copolymer is merely added into polybutylene terephthalate resin.
(2) Compared Examples 2-7 to 2-9 with Comparative Examples 2-6 and 2-7, the addition of silica-supported polyorganosiloxane copolymer remarkably improves the wear resistance.
(3) Compared Examples 2-1 to 2-6 with Comparative Example 2-2, the flame resistance remarkably reduces when the polyorganosiloxane is not in the form of solid at 25° C. Compared them with Comparative Examples 2-5, the flame resistance remarkably reduces when the content of the polyorganosiloxane in the form of solid at 25° C. is too large. Compared them with Comparative Example 2-1, the composition of the invention is remarkably excellent in the mold release performance and also is excellent in the tensile elongation and the wear resistance.

INDUSTRIAL APPLICABILITY

The thermoplastic polyester resin composition of the invention may have the following characteristics.
(1) The composition has excellent flame resistance and mechanical characteristics even if the composition is molded to a molded article having a thickness of 1 mm or less.

(2) Since the resin composition does not comprise a halogen series flame retardant, the composition does not produce dioxine and does not pollute environment very much during the time of burning.
(3) Since the composition is excellent in the flame resistance, it does not change its shape very much when it is molded.
(4) Since the composition has remarkably less mold deposit, it has good productivity in molding.
(5) The article obtained through injection-molding has weld portion having high degree of strength.
(6) The resin composition is excellent in the tracking resistance, and is available to various uses in electric and electronic fields.

Use of the above second technical measure preferably exerts toughness of the mechanical strength. In addition, since it is excellent in friction and abrasion resistance, it produces less abrasion powder of resin and shall give stable electric conduction even if it is used for connectors or terminals which are necessitated to closely fit. In addition, when the molded article is exposed to high temperature, the polyorganosiloxane polymer hardly bleeds out on its surface, and therefore, the appearance thereof and the electric resistance thereof hardly reduces. In addition, the composition may form connector terminal having less pollution and less occurrence of trouble such as electronic conduction interception.

The invention claimed is:

1. A thermoplastic polyester resin composition comprising 100 parts by weight of a thermoplastic polyester resin (A), 5 to 40 parts by weight of a phosphinate (B), and an organosiloxane (X);
   wherein the phosphinate (B) is a calcium salt or aluminium salt of phosphine acid of which an anion part is represented by the formula (1) or (2);

[Chemical 1]

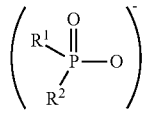
(1)

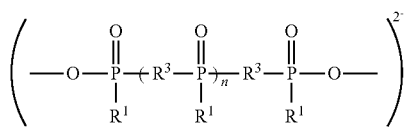
(2)

wherein $R^1$'s and $R^2$'s each independently are an alkyl group having 1 to 6 carbon atoms, or an aryl group which may have a substituent; $R^1$'s may be the same or different to each other; $R^3$'s are an alkylene group having 1 to 10 carbon atoms, an arylene group which may have a substituent, or a combination of at least two thereof; $R^3$'s may be the same or different to each other; and n is an integer of 0 to 4; and
   which, as the organosiloxane (X), comprises 1.5 to 10 parts by weight of an organosiloxane compound (X-1) or 0.01 to 5 parts by weight of an organosiloxane polymer (X-2), relative to 100 parts by weight of the thermoplastic polyester resin (A), wherein the organosiloxane compound (X-1) comprises organic groups bonding to a silicon atom directly or via an oxygen atom, and 40 mole % or more of the organic groups is an aryl group, and the organosiloxane polymer (X-2) is in the form of solid at 25° C.;
   wherein when the thermoplastic polyester resin composition is formed through injection-molding, two obtained molded articles are put to a pressure of 5 Kgf on the contact area thereof, and the molded article of the lower side is turned over at a linear speed of 10 cm/sec for 20 hours while the molded article of the upper side is fixed, the total specific wear rate of the two obtained molded articles is 0.3 mm³/kgf·km or less; and
   when the thermoplastic polyester resin composition is formed to be a molded article having a thickness of 0.8 mm, the obtained molded article satisfies V-0 according to UL-94 test.

2. The thermoplastic polyester resin composition according to claim 1, which comprises 20 to 70 parts by weight of the fibrous reinforcement (Y) and 1 to 5 parts by weight of the metal borate (E), relative to 100 parts by weight of the thermoplastic polyester resin (A).

3. The thermoplastic polyester resin composition according to claim 1, wherein the thermoplastic polyester resin (A) is polyethylene terephthlate or polybutylene terephthalate.

4. The thermoplastic polyester resin composition according to claim 1, wherein the thermoplastic polyester resin (A) is polybutylene terephthalate.

5. The thermoplastic polyester resin composition according to claim 1, which further comprises 20 parts by weight or less of a metal borate (E), relative to 100 parts by weight of the thermoplastic polyester resin (A).

6. The thermoplastic polyester resin composition according to claim 5, which comprises 20 to 35 parts by weight of a calcium salt or aluminium salt of phosphine acid of which an anion part is represented by the formula (1') or (2') as the phosphinate (B), 2 to 7 parts by weight of the organosiloxane compound comprising organic groups bonding to a silicon atom directly or via an oxygen atom, wherein 50 mol % or more of the organic groups are an aryl group, as the organosiloxane compound (X-1), 20 to 70 parts by weight of the fibrous reinforcement (Y), and 1 to 5 parts by weight of the metal borate (E), relative to 100 parts by weight of the thermoplastic polyester resin (A);

[Chemical 2]

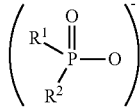
(1')

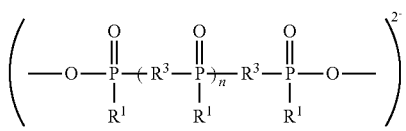
(2')

wherein $R^1$'s and $R^2$'s each independently are an alkyl group having 1 to 4 carbon atoms, $R^1$'s may be the same or different to each other; $R^3$'s are an alkylene group having 1 to 4 carbon atoms or phenylene group; $R^3$'s may be the same or different to each other; n is an integer of 0 to 4.

7. The thermoplastic polyester resin composition according to claim 1,
   which, as the organosiloxane (X), comprises the organosiloxane compound (X-1) comprising organic groups bonding to a silicon atom directly or via an oxygen atom, wherein 40 mole % or more of the organic groups is an aryl group; and which further comprises 5 to 80 parts by weight of fibrous reinforcement (Y).

8. The thermoplastic polyester resin composition according to claim 7, wherein the content of the phosphinate (B) is 20 to 35 parts by weight, relative to 100 parts by weight of the thermoplastic polyester resin (A).

9. The thermoplastic polyester resin composition according to claim 7, wherein 50 mol % or more of the organic groups in the organosiloxane compound (X-1) is an aryl group.

10. The thermoplastic polyester resin composition according to claim 7, wherein the organosiloxane compound (X-1) has a weight-average molecular weight of 200 to 10000.

11. The thermoplastic polyester resin composition according to claim 7, wherein the organosiloxane compound (X-1) comprises the structural unit represented by $RSiO_{1.5}$, wherein R represents an organic group, and the content of hydroxy groups in organosiloxane compound (X-1) is 1 to 10% by weight.

12. The thermoplastic polyester resin composition according to claim 7, wherein the content of the organosiloxane compound (X-1) is 2 to 7 parts by weight, relative to 100 parts by weight of the thermoplastic polyester resin (A).

13. The thermoplastic polyester resin composition according to claim 1, which, as the organosiloxane (X), comprises the organosiloxane polymer (X-2) in the form of solid at 25° C.

14. The thermoplastic polyester resin composition according to claim 13,
which further comprises 2 to 30 parts by weight of a salt of an amino group-containing triazine (C), relative to 100 parts by weight of the thermoplastic polyester resin (A); and
wherein the content of the phosphinate (B) is 7 to 35 parts by weight, and the content of the organosiloxane polymer (X-2) in the form of solid at 25° C. is 0.5 to 4 parts by weight.

15. The thermoplastic polyester resin composition according to claim 13, wherein the organosiloxane polymer (X-2) in the form of solid at 25° C. is selected from the group consisting of an organosiloxane polymer supported with an inorganic particle (X-2-1), an organosiloxane polymer having a melting point of more than 25° C. (X-2-2), a cross-linked organosiloxane (X-2-3), and a polyorganosiloxane core graft copolymer (X-2-4).

16. The thermoplastic polyester resin composition according to claim 13, wherein the organosiloxane polymer (X-2) in the form of solid at 25° C. is a silicone resin having a softening point of more than 25° C.

17. The thermoplastic polyester resin composition according to claim 13, wherein the organosiloxane polymer (X-2) in the form of solid at 25° C. is silicone elastomer powder.

18. The thermoplastic polyester resin composition according to claim 13, wherein the organosiloxane polymer (X-2) in the form of solid at 25° C. is a polyorganosiloxane core graft copolymer.

19. The thermoplastic polyester resin composition according to claim 13, which further comprises 150 parts by weight or less of a fibrous reinforcement (Y), relative to 100 parts by weight of the thermoplastic polyester resin (A).

20. The thermoplastic polyester resin composition according to claim 13, which further comprises 35 parts by weight or less of a salt of an amino group-containing triazine (C), relative to 100 parts by weight of the thermoplastic polyester resin (A).

21. The thermoplastic polyester resin composition according to claim 20, wherein the ratio by weight of the salt of the amino group-containing triazine (C) to the phosphinate (B) ((C)/(B)) is in the range of 0.3 to 1.5.

22. The thermoplastic polyester resin composition according to claim 13, wherein the organosiloxane polymer (X-2) in the form of solid at 25° C. is an organosiloxane polymer supported with silica having a specific surface area of 50 m$^2$/g or more.

23. The thermoplastic polyester resin composition according to claim 22, wherein the organosiloxane polymer (X-2) comprises a functional group.

24. The thermoplastic polyester resin composition according to claim 22, wherein 0.4 to 4 parts by weight of the organosiloxane polymer is supported with 1 part by weight of the silica.

25. A molded article formed from the thermoplastic polyester resin composition according to claim 1 through injection-molding.

* * * * *